United States Patent
Song

(10) Patent No.: US 10,081,931 B2
(45) Date of Patent: Sep. 25, 2018

(54) ELECTRONIC PLUMBING FIXTURE FITTING WITH SENSOR MOUNTED ON ELECTRONIC BOARD

(71) Applicant: Moen Incorporated, North Olmsted, OH (US)

(72) Inventor: Inho Song, Chesterland, OH (US)

(73) Assignee: Moen Incorporated, North Olmsted, OH (US)

( * ) Notice: Subject to any disclaimer, the term of this patent is extended or adjusted under 35 U.S.C. 154(b) by 65 days.

(21) Appl. No.: 15/001,146

(22) Filed: Jan. 19, 2016

(65) Prior Publication Data
US 2016/0208467 A1    Jul. 21, 2016

Related U.S. Application Data

(60) Provisional application No. 62/105,176, filed on Jan. 19, 2015.

(51) Int. Cl.
| | |
|---|---|
| *E03C 1/05* | (2006.01) |
| *F16K 31/05* | (2006.01) |
| *F16K 31/02* | (2006.01) |
| *F16K 1/38* | (2006.01) |
| *F16K 11/22* | (2006.01) |
| *F16K 27/02* | (2006.01) |
| *F16K 31/04* | (2006.01) |

(52) U.S. Cl.
CPC .............. *E03C 1/057* (2013.01); *F16K 1/385* (2013.01); *F16K 11/22* (2013.01); *F16K 27/0263* (2013.01); *F16K 31/02* (2013.01); *F16K 31/04* (2013.01); *Y10T 137/9464* (2015.04)

(58) Field of Classification Search
CPC ....... Y10T 137/9464; Y10T 137/87579; Y10T 137/87684; Y10T 137/87917; Y10T 137/97925; Y10T 137/87933; Y10T 137/87941; Y10T 137/87981; Y10T 137/87997; Y10T 137/88062; Y10T 137/87925; Y10T 137/880628; E03C 1/057; E03C 1/055; E03C 2001/0418; F16K 19/006; F16K 37/0041; F16K 31/05; F16K 31/055; F16K 37/005
See application file for complete search history.

(56) References Cited

U.S. PATENT DOCUMENTS

| | | | |
|---|---|---|---|
| 4,638,832 A | 1/1987 | Mokveld | |
| 4,955,535 A * | 9/1990 | Tsutsui | G05D 23/1393 137/606 |

(Continued)

FOREIGN PATENT DOCUMENTS

WO    9939978    8/1999

OTHER PUBLICATIONS

International Search Report for International App. No. PCT/US2016/013962 dated Jul. 12, 2016 (4 pages).

(Continued)

*Primary Examiner* — Seth W Mackay-Smith
(74) *Attorney, Agent, or Firm* — Calfee, Halter & Griswold LLP

(57) ABSTRACT

The present invention provides an electronic plumbing fixture fitting with a sensor mounted on an electronic board, such as an electronic faucet with a sensor mounted on an electronic board.

2 Claims, 30 Drawing Sheets

(56) References Cited

U.S. PATENT DOCUMENTS

| | | | | |
|---|---|---|---|---|
| 5,549,487 A | * | 8/1996 | Nortier | E03C 1/055 361/730 |
| 5,984,262 A | * | 11/1999 | Parsons | E03C 1/057 250/221 |
| 7,156,267 B2 | | 1/2007 | Langa | |
| 8,365,767 B2 | * | 2/2013 | Davidson | E03C 1/0404 137/559 |
| 8,496,025 B2 | | 7/2013 | Parsons et al. | |
| 8,549,677 B2 | * | 10/2013 | Weigen | E03C 1/057 251/30.03 |
| 9,010,377 B1 | | 4/2015 | O'Brien et al. | |
| 9,194,110 B2 | | 11/2015 | Frick et al. | |
| 9,212,473 B2 | | 12/2015 | Baker et al. | |
| 9,758,951 B2 | | 9/2017 | Evans et al. | |
| 9,828,751 B2 | | 11/2017 | Parikh et al. | |
| 2002/0019709 A1 | * | 2/2002 | Segal | G07C 1/10 702/45 |
| 2003/0088338 A1 | * | 5/2003 | Phillips | B67D 1/1204 700/282 |
| 2006/0130907 A1 | * | 6/2006 | Marty | E03C 1/0404 137/613 |
| 2006/0202142 A1 | * | 9/2006 | Marty | E03C 1/055 251/129.04 |
| 2007/0157978 A1 | * | 7/2007 | Jonte | E03C 1/05 137/613 |
| 2008/0115836 A1 | * | 5/2008 | Hsieh | E03C 1/057 137/88 |
| 2010/0206956 A1 | * | 8/2010 | Gautschi | E03C 1/0412 236/12.12 |
| 2011/0186161 A1 | * | 8/2011 | Chen | E03C 1/057 137/637 |
| 2013/0248019 A1 | * | 9/2013 | Frick | E03C 1/04 137/468 |
| 2013/0248033 A1 | | 9/2013 | Parikh et al. | |
| 2013/0248620 A1 | * | 9/2013 | Evans | E03C 1/04 239/195 |
| 2013/0291978 A1 | * | 11/2013 | Baker | E03C 1/04 137/801 |
| 2014/0021384 A1 | | 1/2014 | Kabel et al. | |
| 2016/0076233 A1 | | 3/2016 | Parikh et al. | |

OTHER PUBLICATIONS

Written Opinion of the International Searching Authority for International App. No. PCT/US2016/013962 dated Jul. 12, 2016 (7 pages).

* cited by examiner

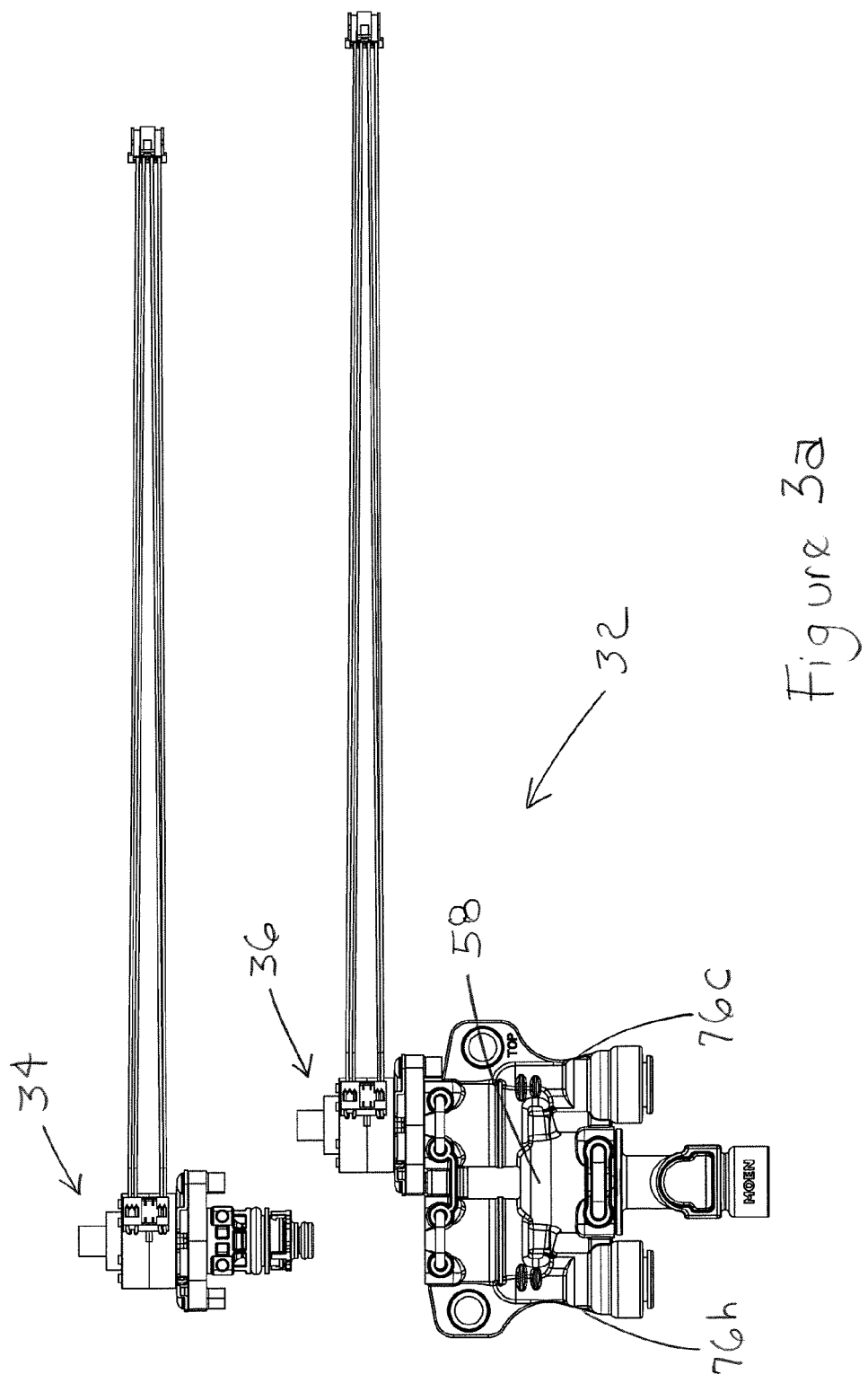

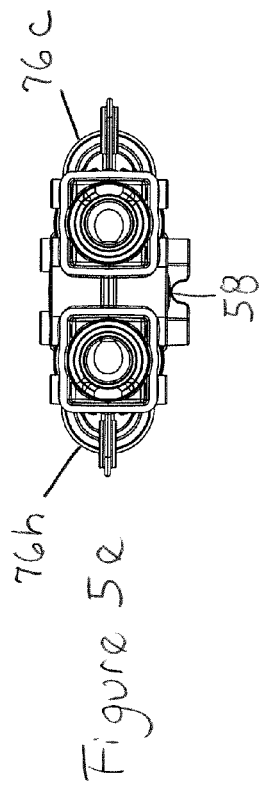
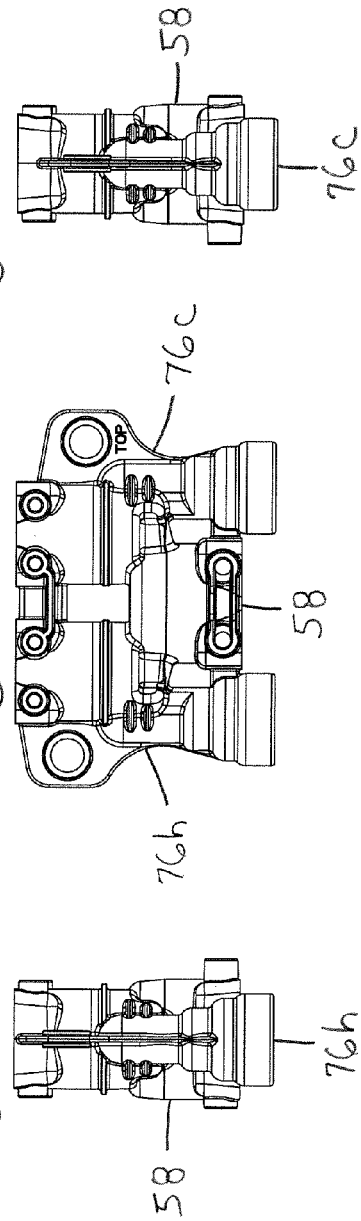
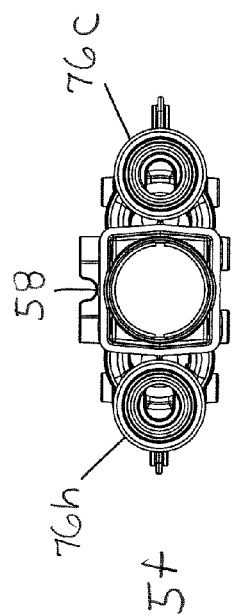

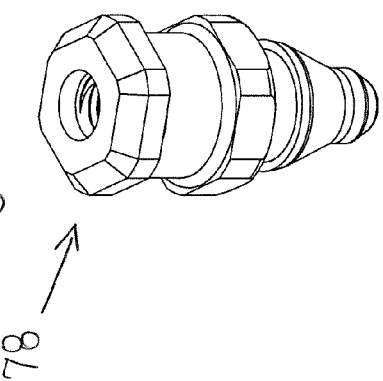
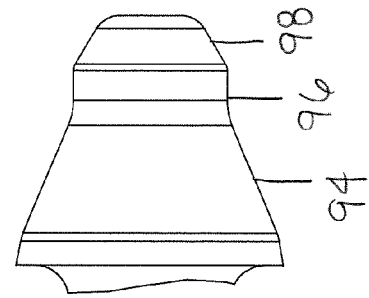
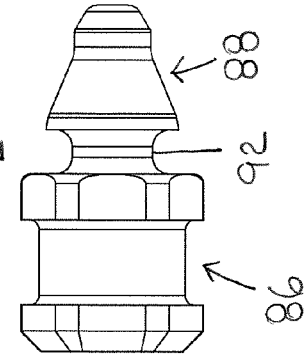
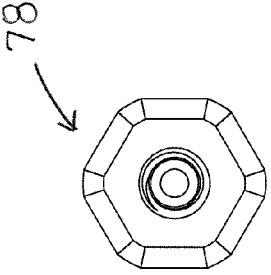
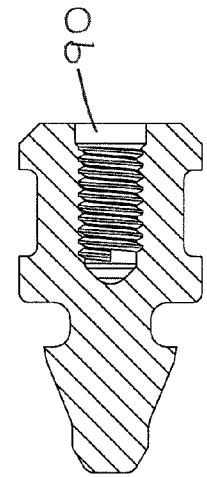

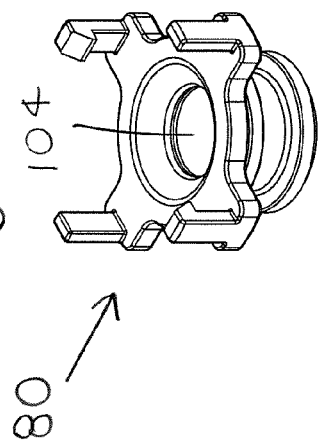
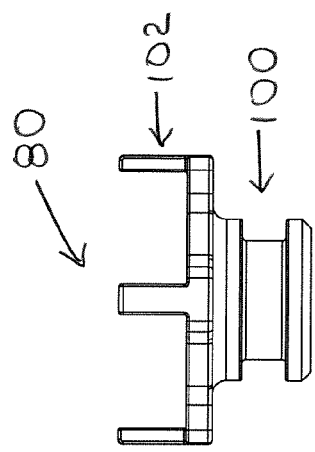
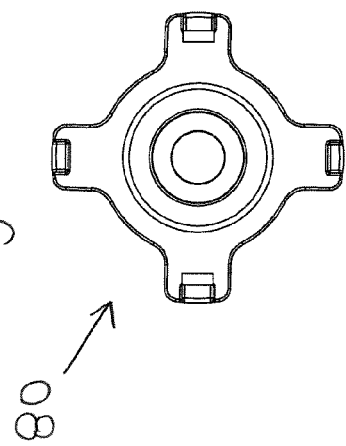
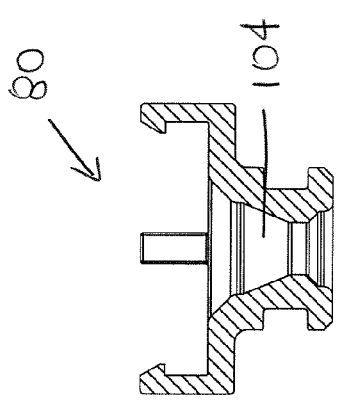
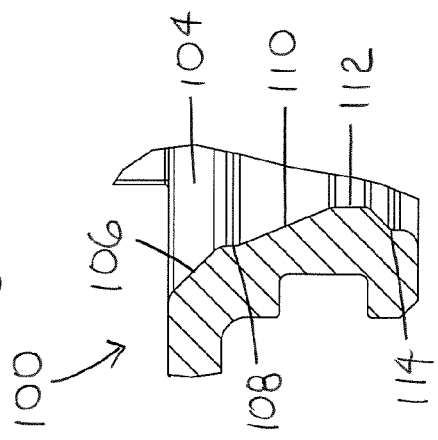

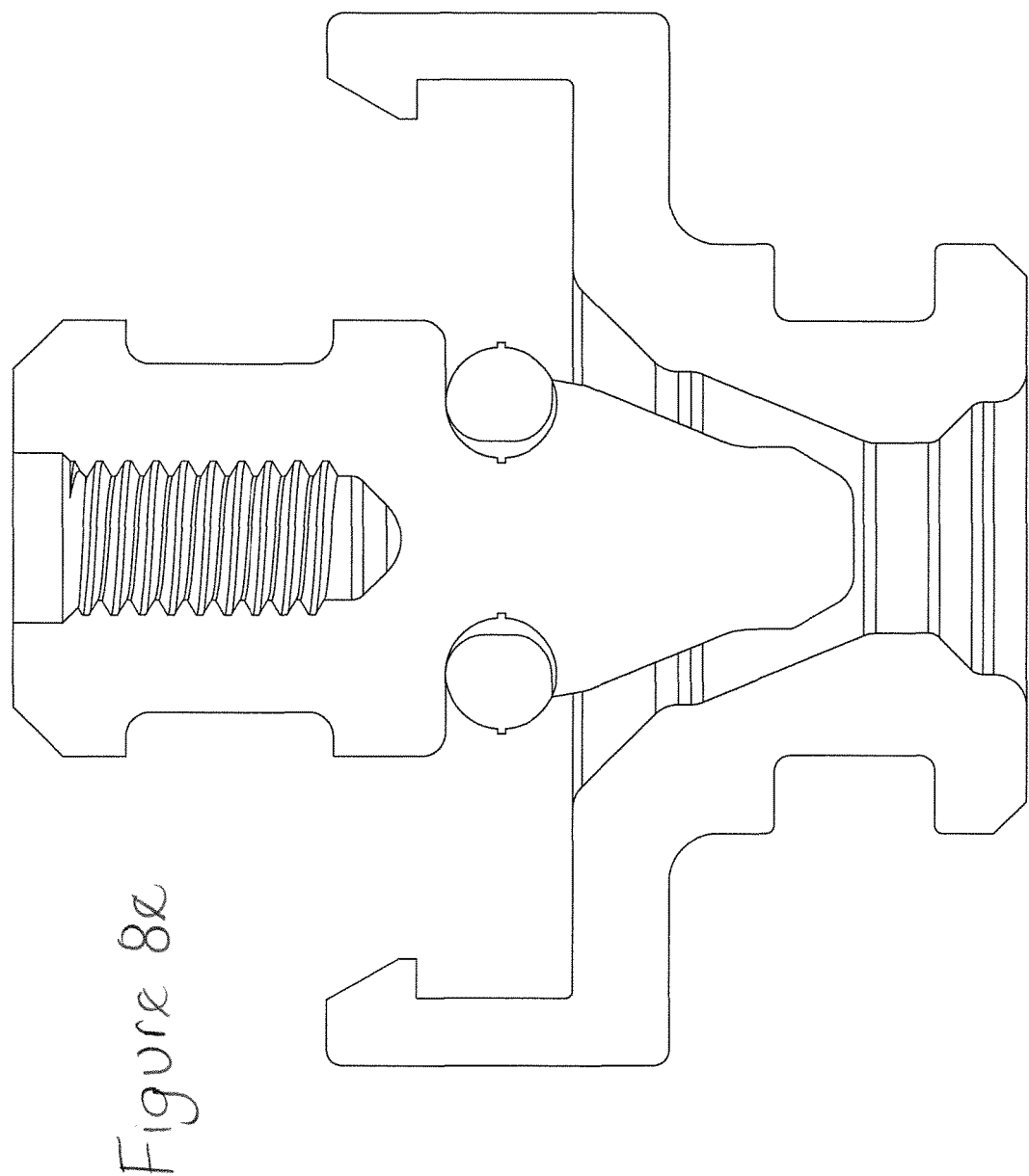
Figure 8α

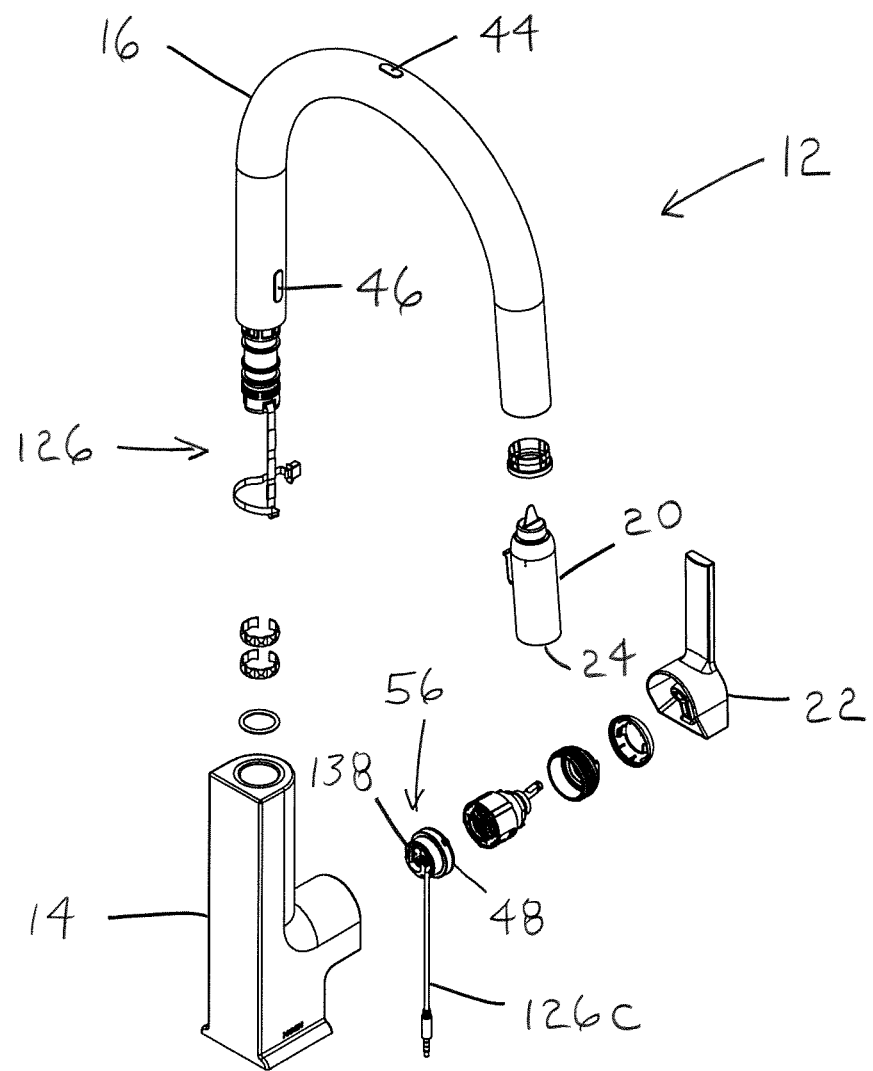
Figure 12a

ELECTRONIC PLUMBING FIXTURE FITTING WITH SENSOR MOUNTED ON ELECTRONIC BOARD

CROSS-REFERENCE TO RELATED APPLICATION

This application claims the benefit of U.S. Provisional Application No. 62/105,176, filed Jan. 19, 2015, the entire disclosure of which is hereby incorporated by reference.

FIELD

The present invention relates generally to an electronic plumbing fixture fitting with a sensor mounted on an electronic board, such as an electronic faucet with a sensor mounted on an electronic board.

BACKGROUND

Electronic plumbing fixture fittings, such as electronic faucets, are well known. Such electronic plumbing fixture fittings are used in residential and commercial applications, such as in kitchens, bathrooms, and various other locations.

SUMMARY

The present invention provides an electronic plumbing fixture fitting with a sensor mounted on an electronic board.

In an exemplary embodiment, the electronic plumbing fixture fitting comprises a discharge outlet, an electronic valve, a sensor, an electronic control, and a cable. The discharge outlet is operable to deliver water. The discharge outlet is located above a mounting surface for the fitting. The electronic valve is operable to permit flow of water through the discharge outlet when the electronic valve is activated and to not permit flow of water through the discharge outlet when the electronic valve is deactivated. The sensor is operable to send a signal when the sensor is triggered. The sensor is mounted on an electronic board. The sensor is located above the mounting surface. The electronic control is operable to receive the signal from the sensor when the sensor is triggered and, in response, send a signal to the electronic valve to activate the electronic valve. At least a portion of the electronic control is located above the mounting surface. The cable is operable to electrically connect the sensor to the electronic control. At least a portion of the cable is operable to electrically connect the sensor to the portion of the electronic control located above the mounting surface. The electronic board and the portion of the cable operable to electrically connect the sensor to the portion of the electronic control located above the mounting surface are integrally formed.

In an exemplary embodiment, the electronic plumbing fixture fitting comprises a discharge outlet, an electronic valve, a first sensor, a second sensor, an electronic control, a first cable, and a second cable. The discharge outlet is operable to deliver water. The discharge outlet is located above a mounting surface for the fitting. The electronic valve is operable to permit flow of water through the discharge outlet when the electronic valve is activated and to not permit flow of water through the discharge outlet when the electronic valve is deactivated. The first sensor is operable to send a first signal when the first sensor is triggered. The first sensor is mounted on a first electronic board. The first sensor is located above the mounting surface. The second sensor is operable to send a second signal when the second sensor is triggered. The second sensor is mounted on a second electronic board. The second sensor is located above the mounting surface. The electronic control is operable to receive the first signal from the first sensor when the first sensor is triggered and, in response, send a first signal to the electronic valve to activate the electronic valve. The electronic control is operable to receive the second signal from the second sensor when the second sensor is triggered and, in response, send a second signal to the electronic valve to activate the electronic valve. At least a portion of the electronic control is located above the mounting surface. The first cable is operable to electrically connect the first sensor to the second sensor. The first cable is located above the mounting surface. The second cable is operable to electrically connect the second sensor to the electronic control. At least a portion of the second cable is operable to electrically connect the second sensor to the portion of the electronic control located above the mounting surface. The first electronic board, the second electronic board, the first cable, and at least the portion of the second cable operable to electrically connect the second sensor to the portion of the electronic control located above the mounting surface are integrally formed.

In an exemplary embodiment, the electronic plumbing fixture fitting comprises a discharge outlet, an electronic valve, a first sensor, a second sensor, an electronic control, a first cable, and a second cable. The discharge outlet is operable to deliver water. The discharge outlet is located above a mounting surface for the fitting. The electronic valve is operable to permit flow of water through the discharge outlet when the electronic valve is activated and to not permit flow of water through the discharge outlet when the electronic valve is deactivated. The first sensor is operable to send a first signal when the first sensor is triggered. The first sensor is mounted on a first electronic board. The first sensor is located above the mounting surface. The second sensor is operable to send a second signal when the second sensor is triggered. The second sensor is mounted on a second electronic board. The second sensor is located above the mounting surface. The electronic control is operable to receive the first signal from the first sensor when the first sensor is triggered and, in response, send a first signal to the electronic valve to activate the electronic valve. The electronic control is operable to receive the second signal from the second sensor when the second sensor is triggered and, in response, send a second signal to the electronic valve to activate the electronic valve. The first cable is operable to electrically connect the first sensor to the second sensor. The first cable is located above the mounting surface. The second cable is operable to electrically connect the second sensor to the electronic control. At least a portion of the second cable is located above the mounting surface. The first electronic board, the second electronic board, and the first cable are integrally formed.

BRIEF DESCRIPTION OF THE DRAWINGS

FIGS. 3a and 3b include views of an electronic mixing valve, including a hot water electronic valve, a cold water electronic valve, and a housing, according to an exemplary embodiment of the present invention—FIG. 3a is an exploded perspective view, and FIG. 3b is a central cross-sectional view;

—FIG. 4a is a perspective view, FIG. 4b is an exploded perspective view, FIG. 4c is a front view, FIG. 4d is a top view, FIG. 4e is a bottom view, and FIG. 4f is a central cross-sectional view;

FIGS. 5a-5g include views of the housing of FIGS. 3a and 3b, according to an exemplary embodiment of the present invention—FIG. 5a is a perspective view, FIG. 5b is a front view, FIG. 5c is a left view, FIG. 5d is a right view, FIG. 5e is a top view, FIG. 5f is a bottom view, and FIG. 5g is a central cross-sectional view;

FIGS. 6a-6e include views of the piston of FIGS. 4a-4f, including a body and a nose, according to an exemplary embodiment of the present invention—FIG. 6a is a perspective view, FIG. 6b is a front view, FIG. 6c is a left view, FIG. 6d is a central cross-sectional view, and FIG. 6e is a detailed front view of the nose;

FIGS. 7a-7e include views of the seat of FIGS. 4a-4f, including a body and projections, according to an exemplary embodiment of the present invention—FIG. 7a is a perspective view, FIG. 7b is a front view, FIG. 7c is a top view, FIG. 7d is a central cross-sectional view, and FIG. 7e is a detailed central cross-sectional view of a portion of the body;

FIGS. 8a-8e include central cross-sectional views of the piston and the seat of FIGS. 6a-6e and 7a-7e during various phases of operation of the hot/cold water electronic valve of FIGS. 4a-4f incorporating the piston and the seat of FIGS. 6a-6e and 7a-7e-FIG. 8a shows a completely closed position, FIG. 8b shows a cracked open position, FIG. 8c shows an open position in which flow begins to increase, FIG. 8d shows a half open position, and FIG. 8e shows a completely open position;

—FIG. 9a is a perspective view, FIG. 9b is a front view, FIG. 9c is a left view, and FIG. 9d is a central cross-sectional view;

—FIG. 10a is a perspective view, FIG. 10b is a front view, FIG. 10c is a top view, and FIG. 10d is a central cross-sectional view;

FIGS. 11a-11e include central cross-sectional views of the piston and the seat of FIGS. 9a-9d and 10a-10d during various phases of operation of the hot/cold water electronic valve of FIGS. 4a-4f incorporating the piston and the seat of FIGS. 9a-9d and 10a-10d-FIG. 11a shows a completely closed position, FIG. 11b shows a cracked open position, FIG. 11c shows an open position in which flow begins to increase, FIG. 11d shows a half open position, and FIG. 11e shows a completely open position;

FIG. 12a-12c include views of portions of the electronic faucet of FIG. 2, including electronic boards and cables, according to an exemplary embodiment of the present invention —FIG. 12a is an exploded perspective view, FIG. 12b is an assembled perspective view, and FIG. 12c is an exploded perspective view; —FIG. 13a is a top view, FIG. 13b is a bottom view, FIG. 13c is a side view, and FIG. 13d is a detailed view of the circled section of FIG. 13b.

DETAILED DESCRIPTION

The present invention provides an electronic plumbing fixture fitting. In an exemplary embodiment, the electronic plumbing fixture fitting is an electronic faucet. However, one of ordinary skill in the art will appreciate that the electronic plumbing fixture fitting could be an electronic showering system, an electronic showerhead, an electronic handheld shower, an electronic body spray, an electronic side spray, or any other electronic plumbing fixture fitting.

Figure 1:
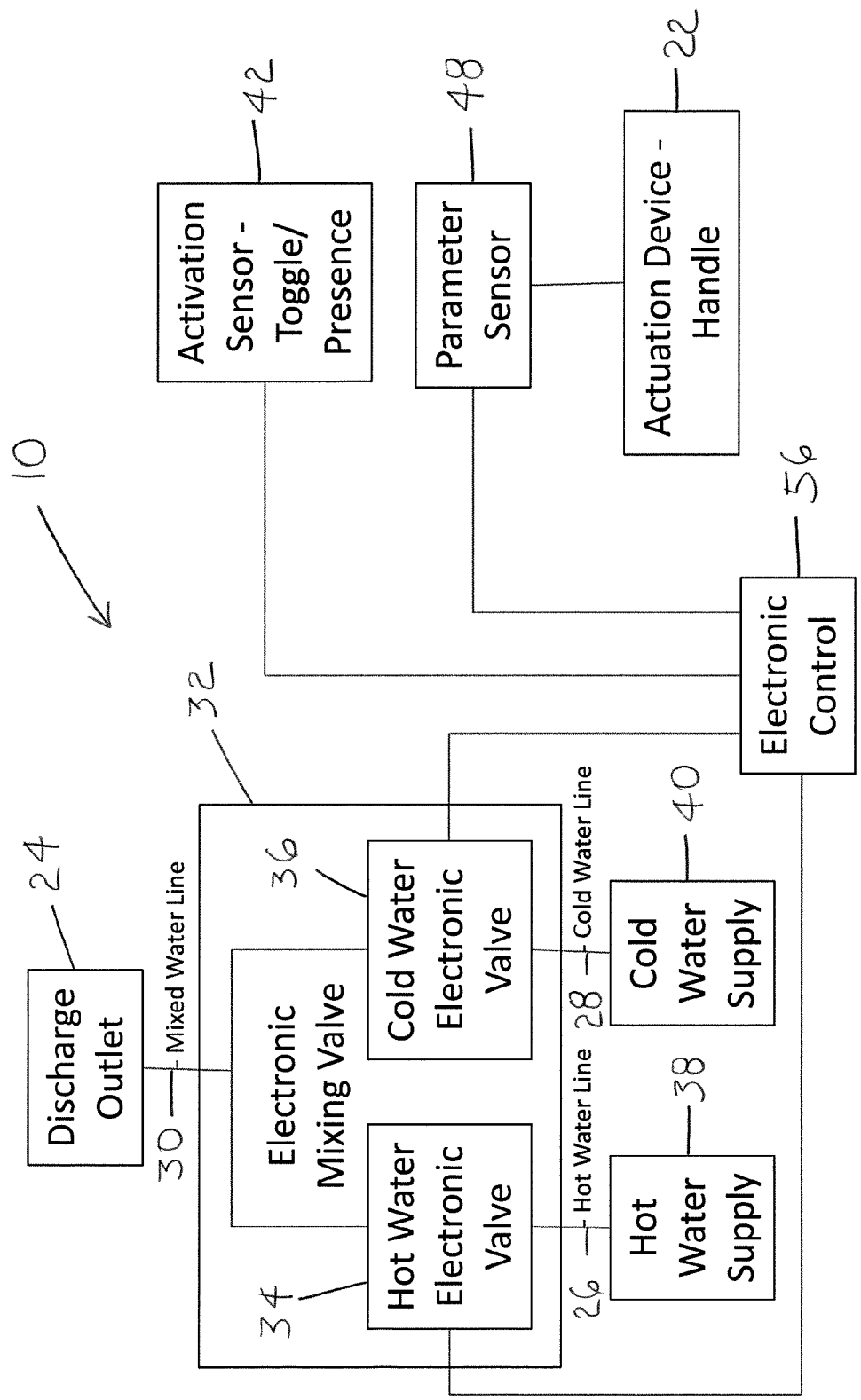
FIG. 1 is a schematic illustration of an electronic plumbing fixture fitting according to an exemplary embodiment of the present invention.

An exemplary embodiment of an electronic plumbing fixture fitting 10, such as an electronic faucet 12, is illustrated in FIG. 1. An exemplary embodiment of the electronic faucet 12 is illustrated in FIG. 2.

Figure 2:
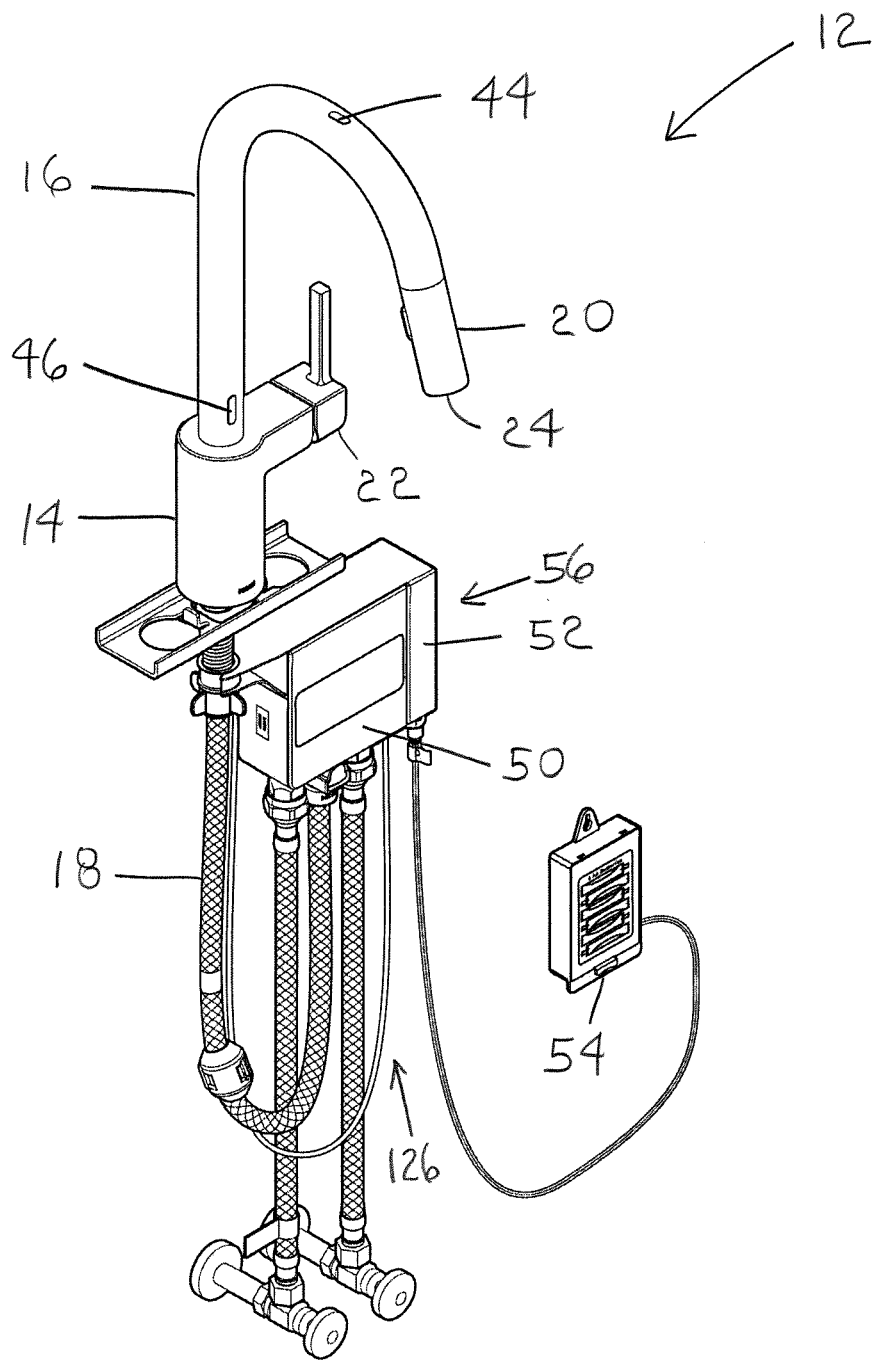
FIG. 2 is a perspective view of an electronic faucet according to an exemplary embodiment of the present invention.
Figure 3B:
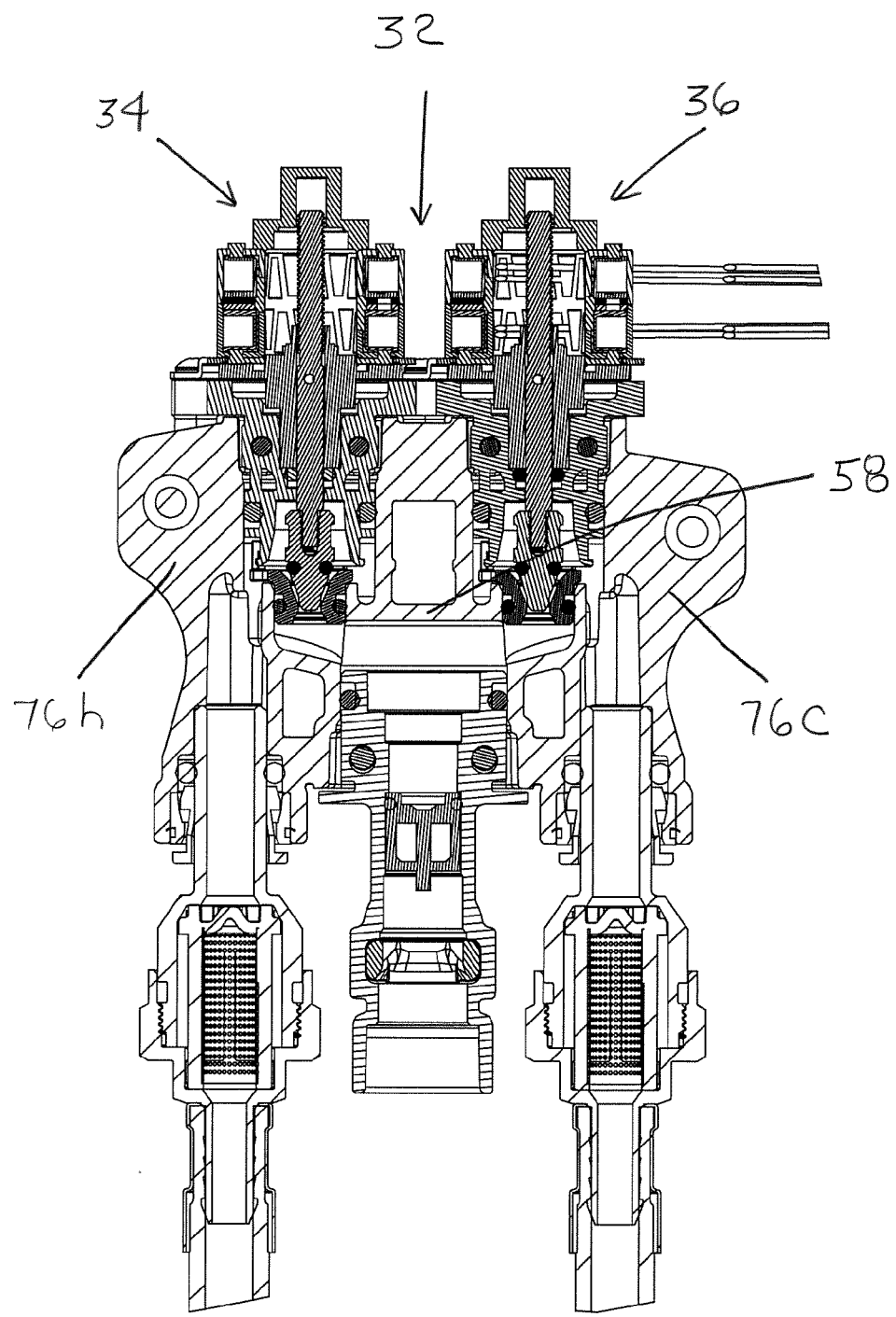
Figure 4A:
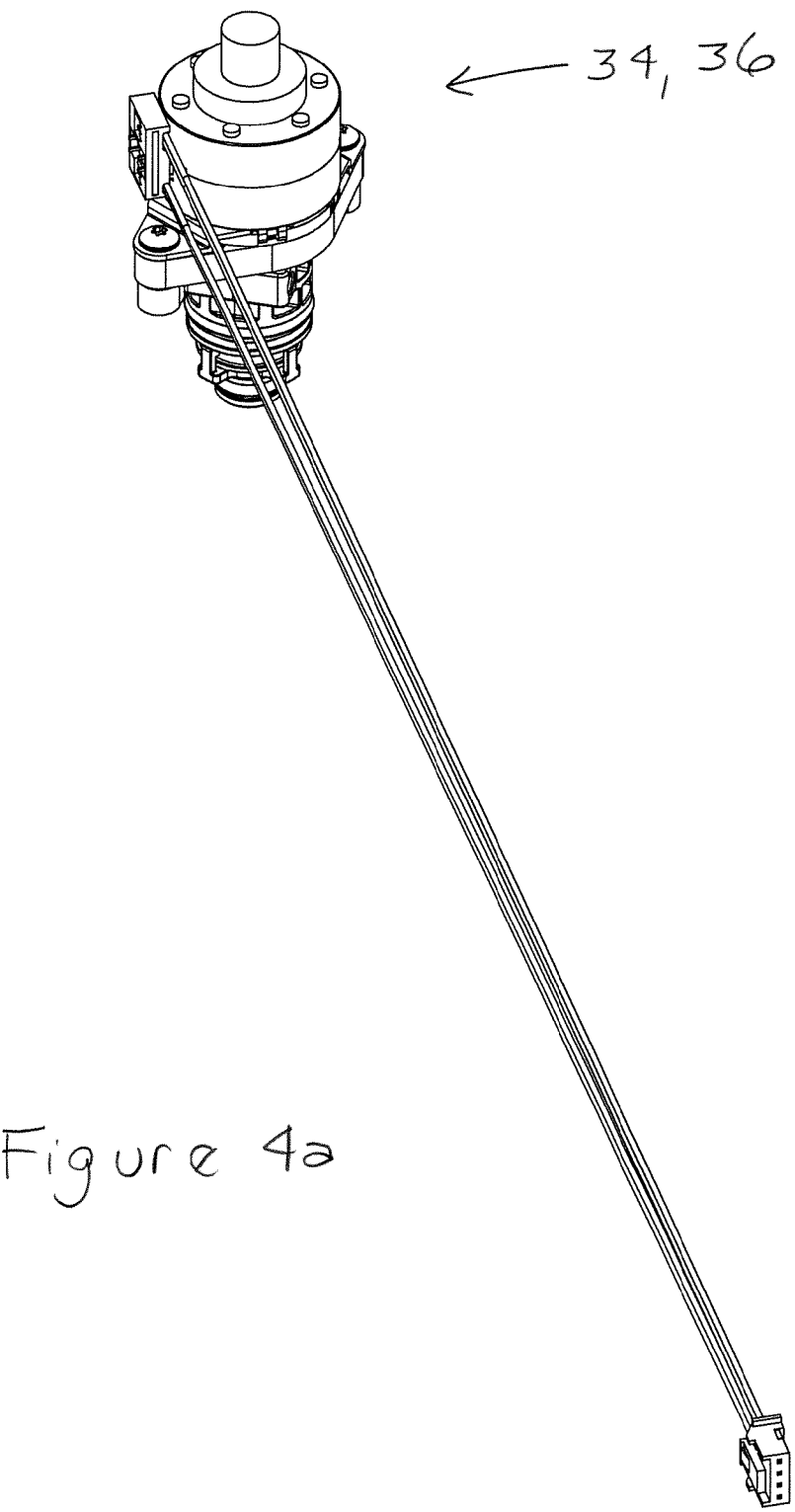
FIGS. 4a-4f include views of the hot/cold water electronic valve of FIGS. 3a and 3b, including a piston and a seat, according to an exemplary embodiment of the present invention
Figure 4B:
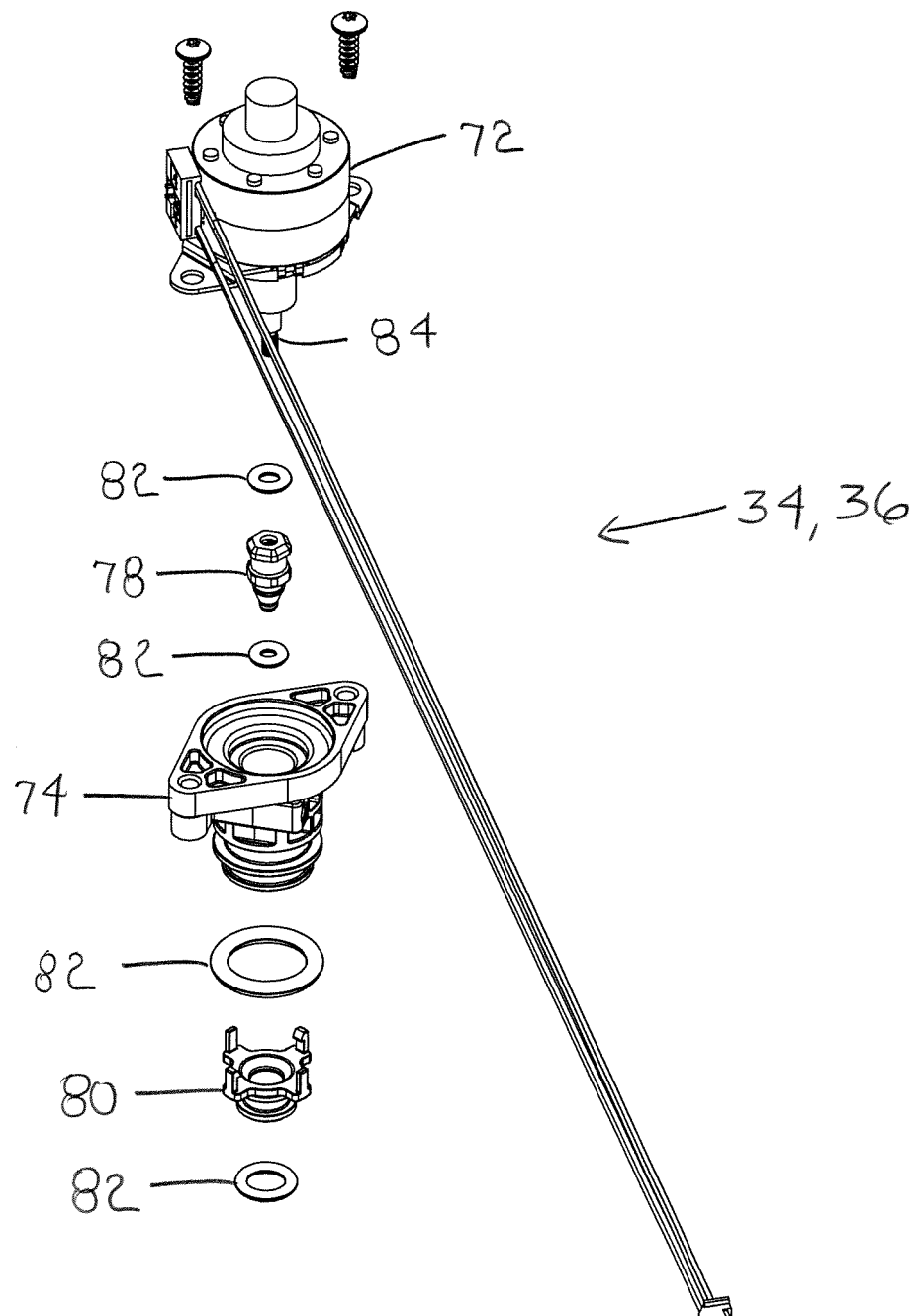
Figure 4D:
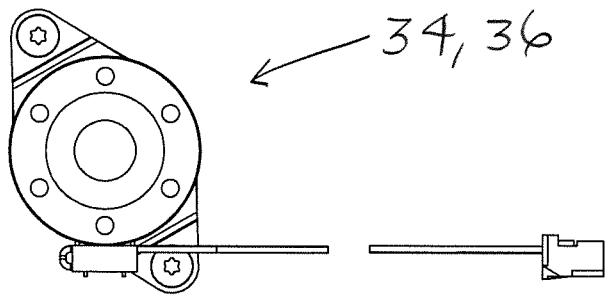
Figure 4C:
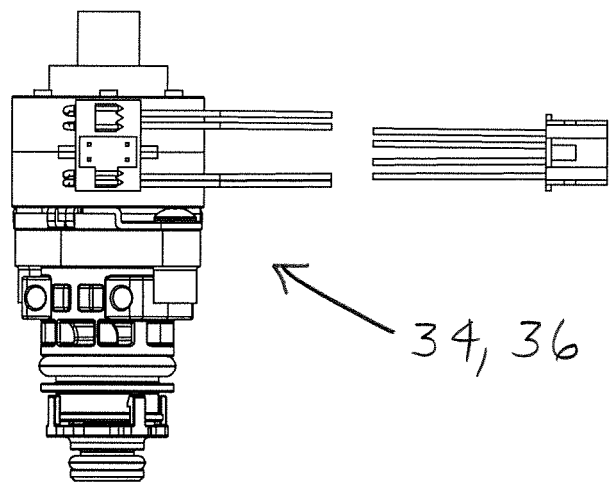
Figure 4E:
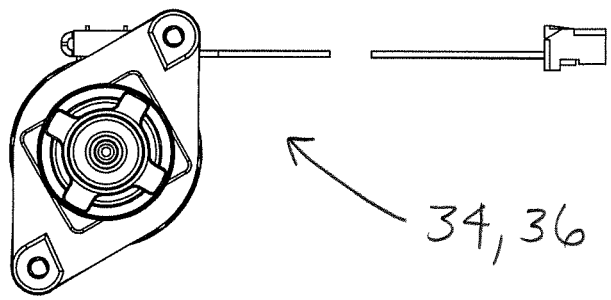
Figure 4F:
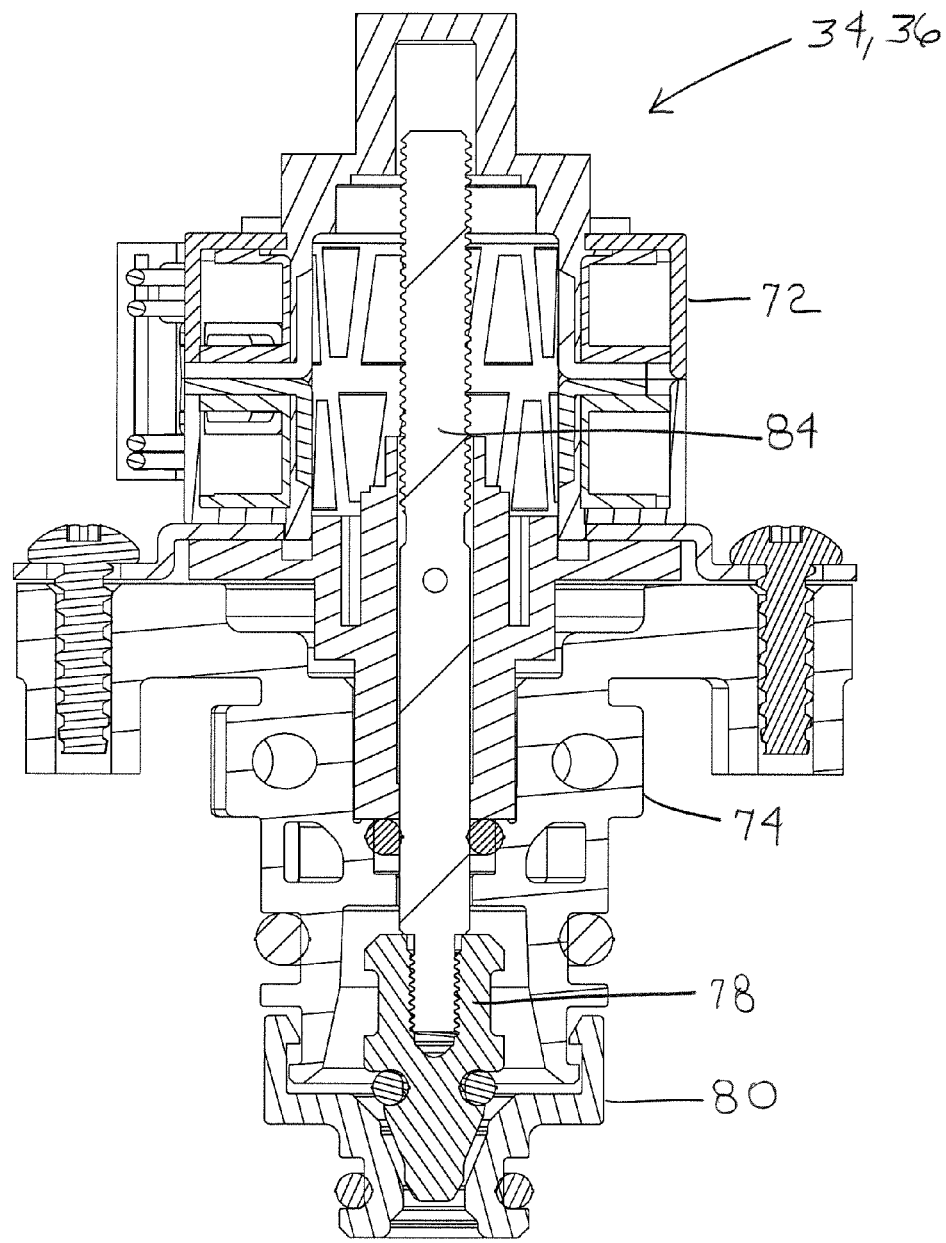
Figure 5A:
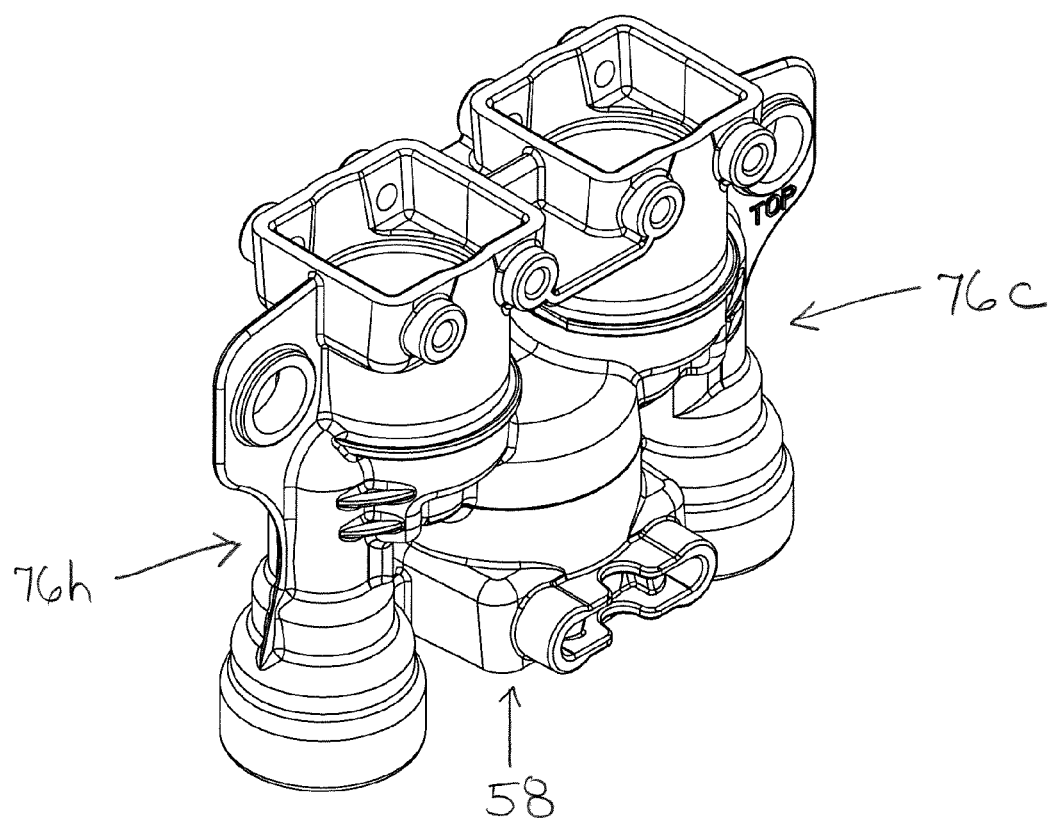
Figure 59:
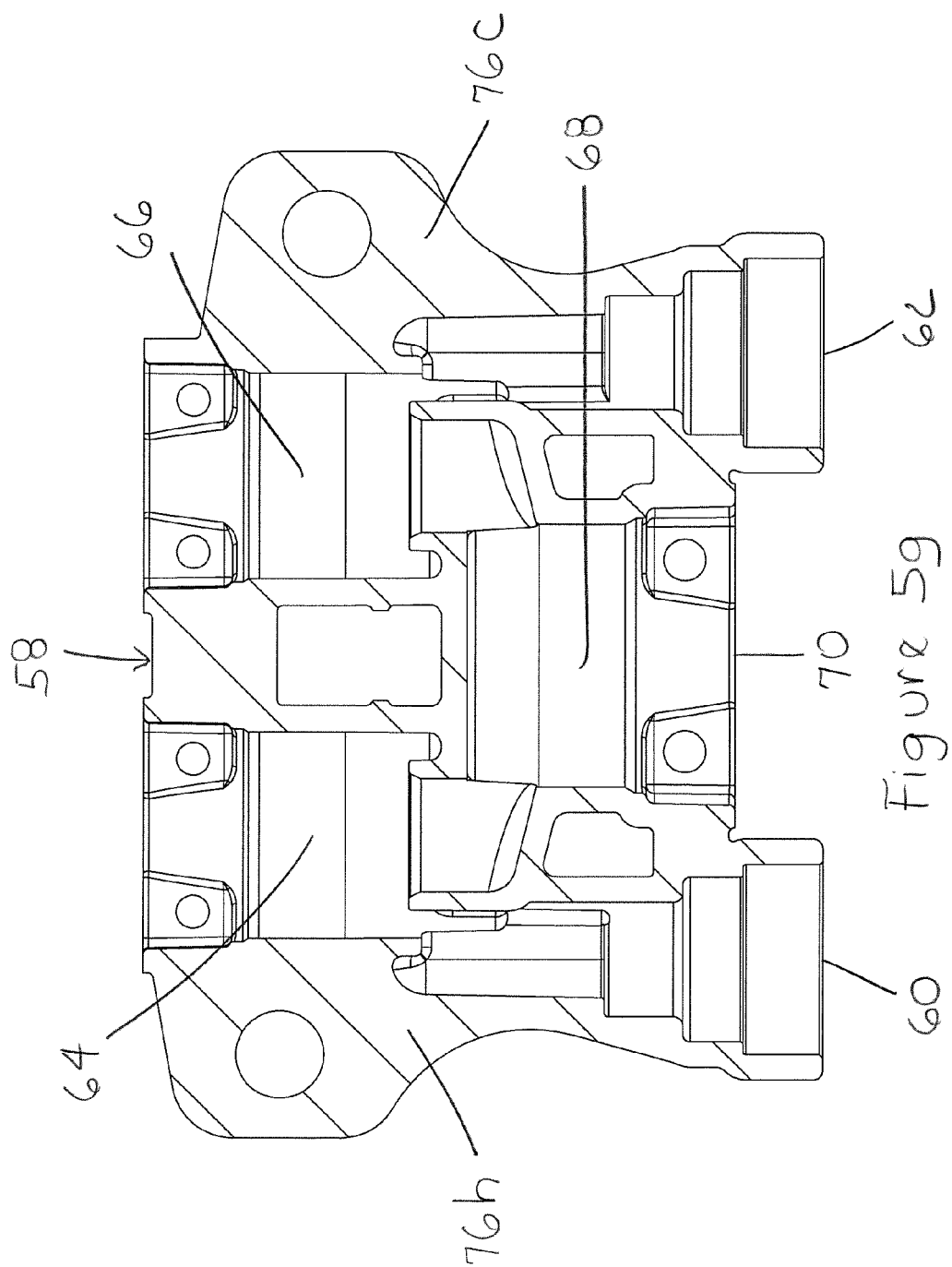
Figure 8A:
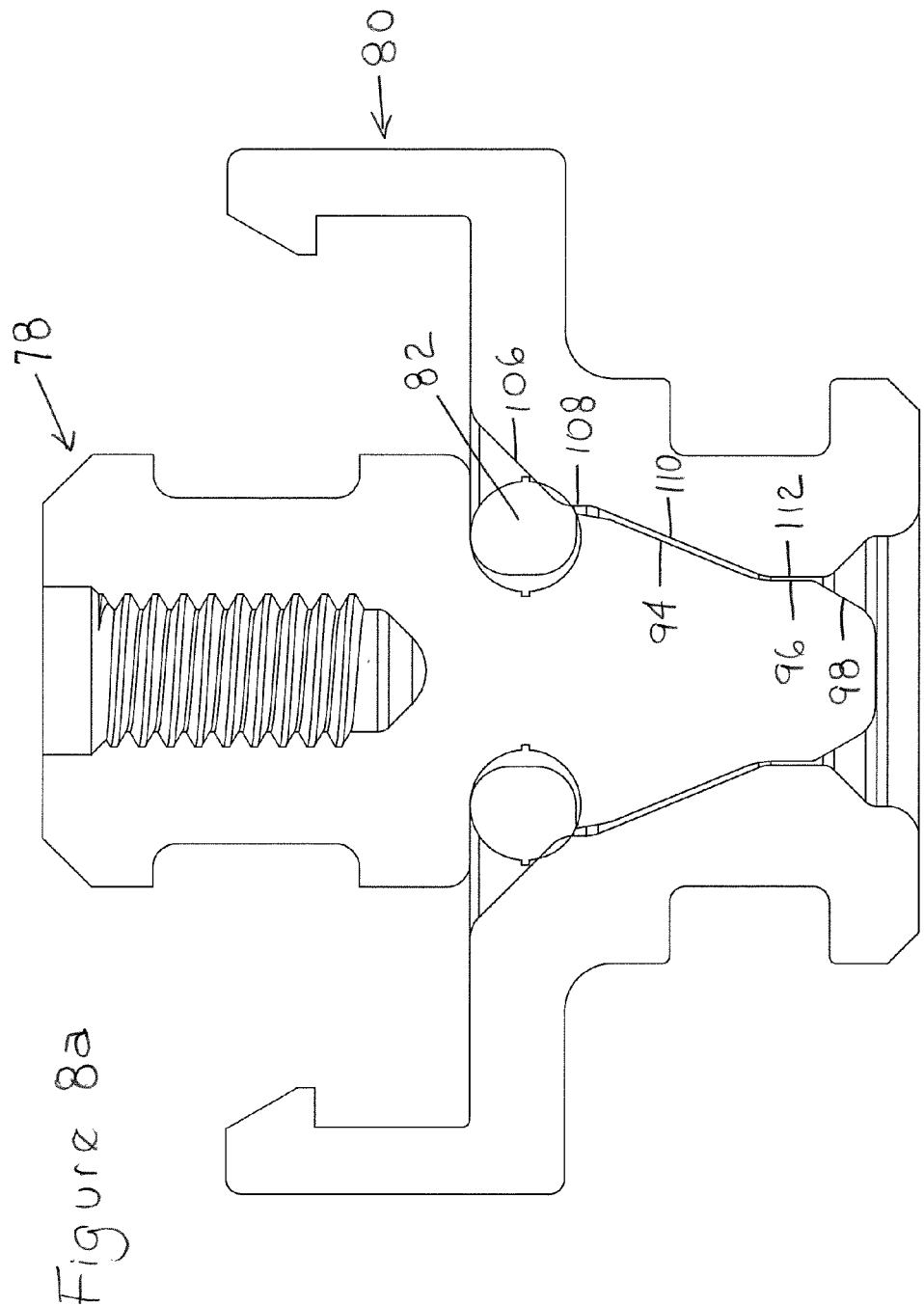
Figure 8B:
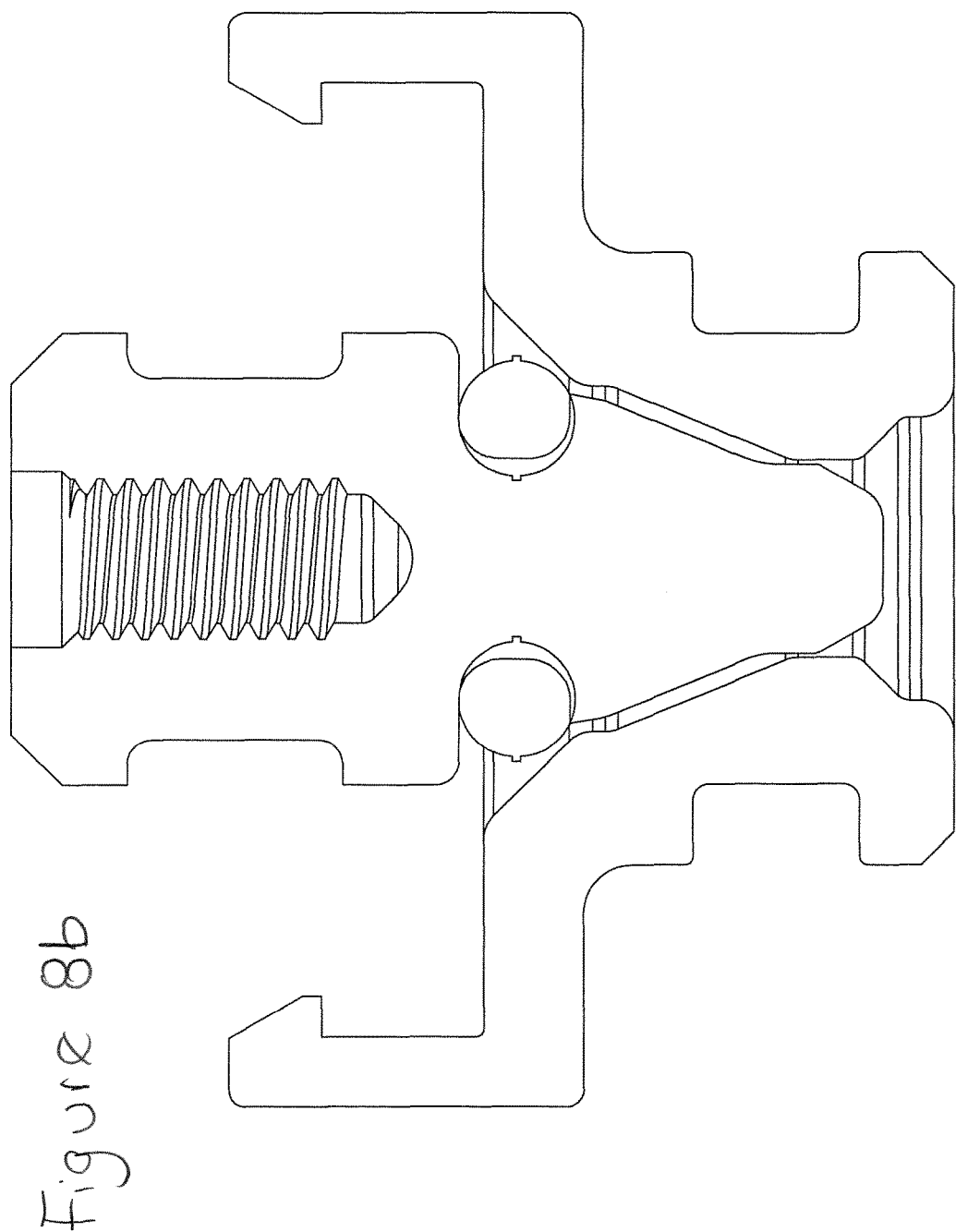
Figure 8C:
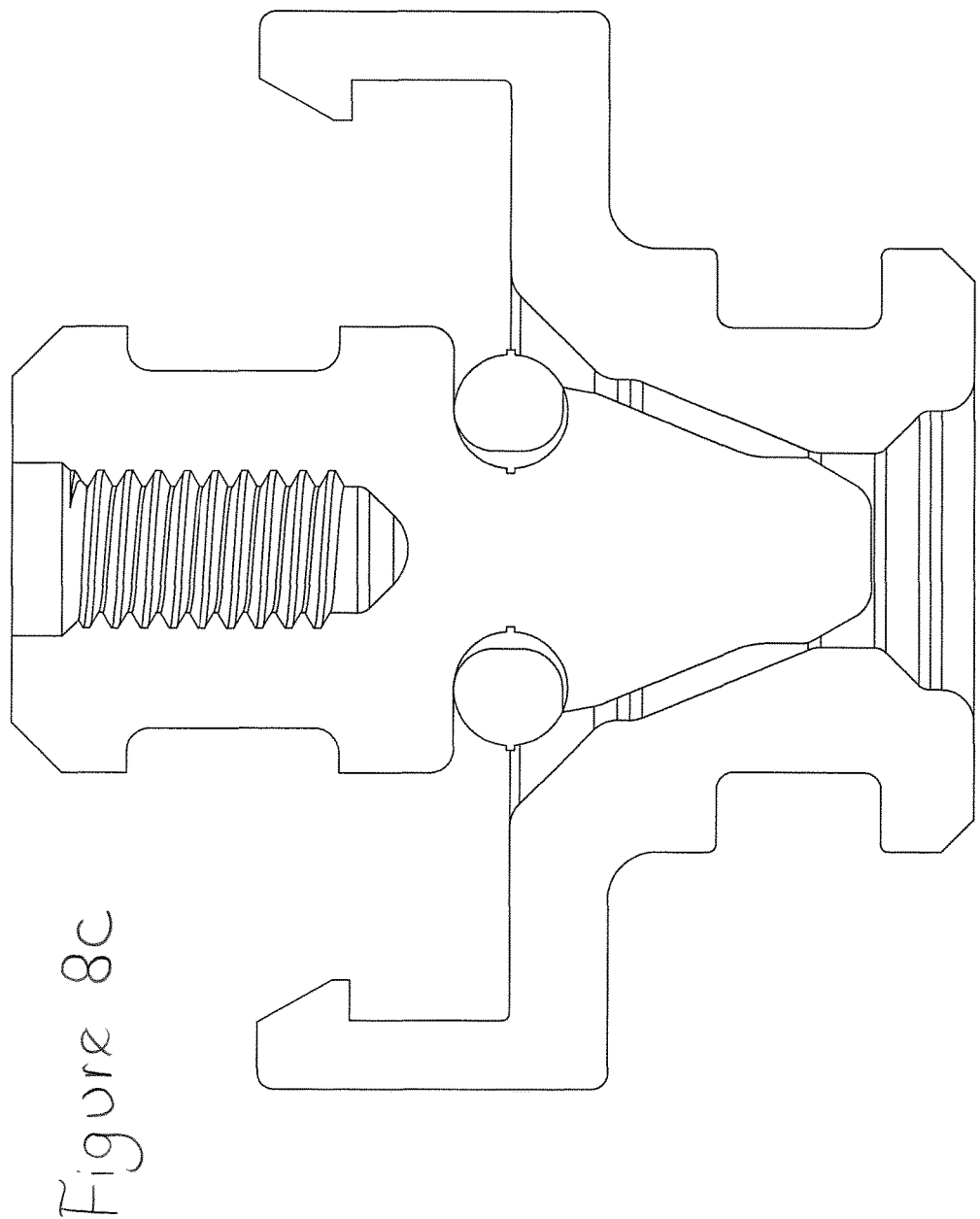
Figure 8D:
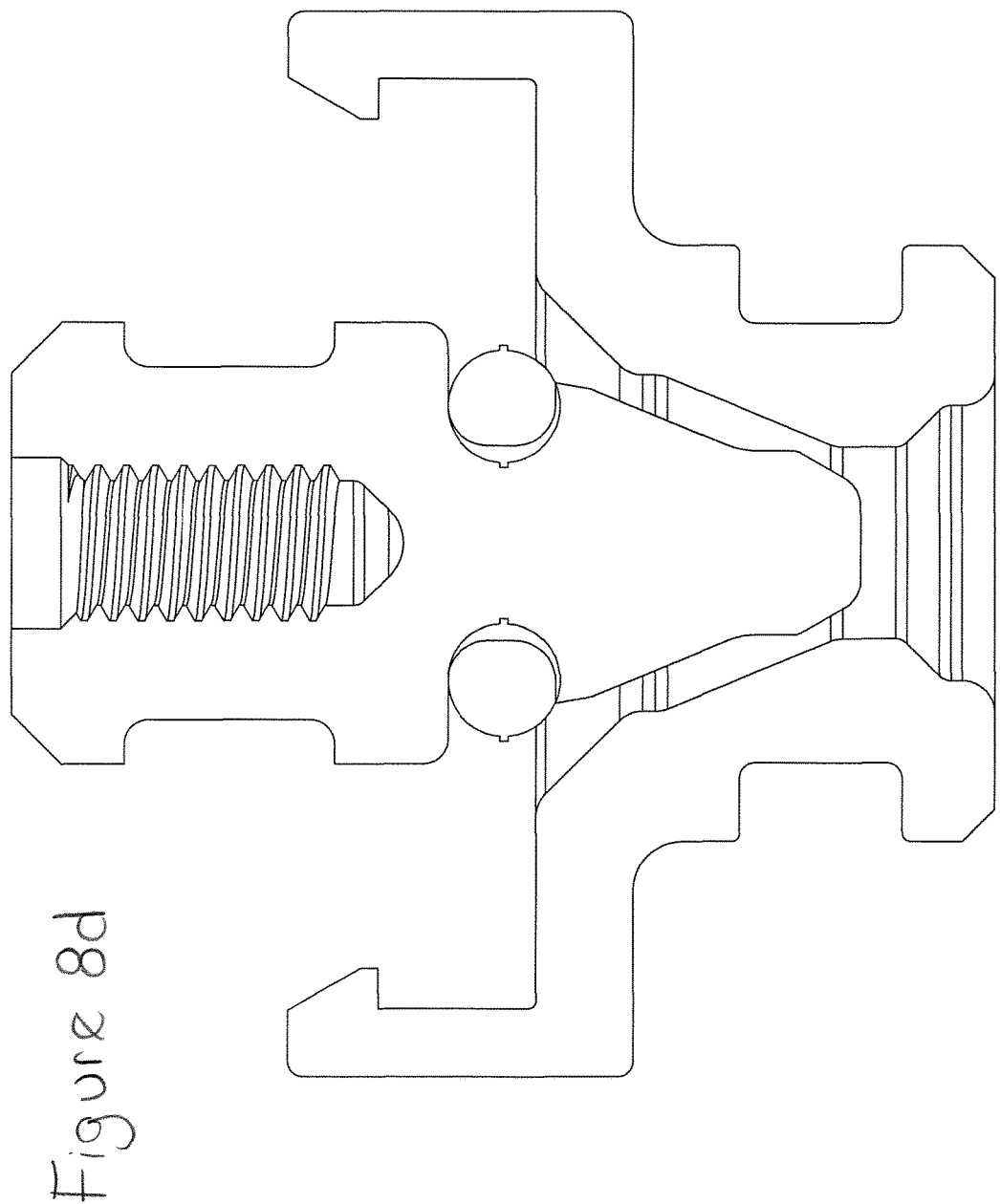
Figure 9A:
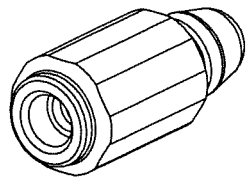
FIGS. 9a-9d include views of another embodiment of a piston, including a body and a nose, according to another exemplary embodiment of the present invention
Figure 9B:
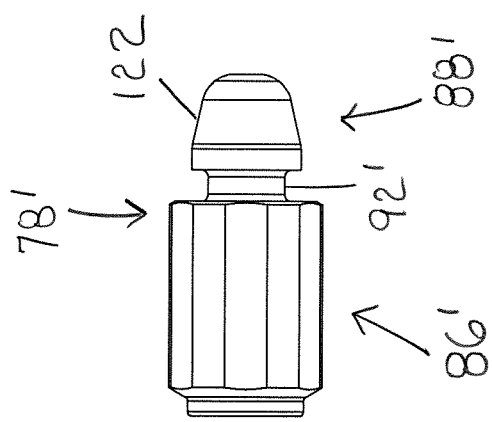
Figure 9C:
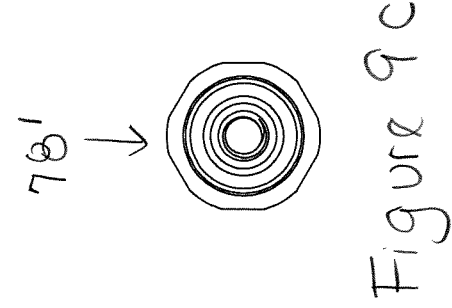
Figure 9D:
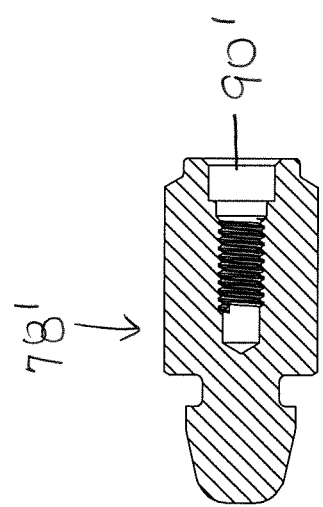
Figure 10A:
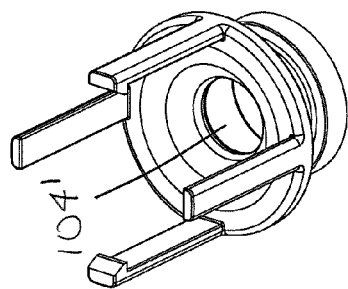
FIGS. 10a-10d include views of another embodiment of a seat, including a body and projections, according to another exemplary embodiment of the present invention
Figure 10B:
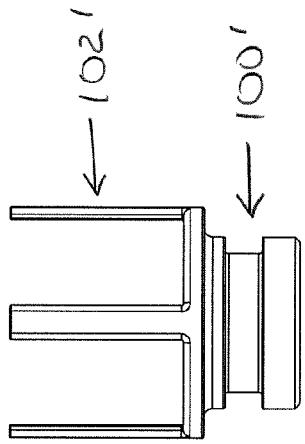
Figure 10C:
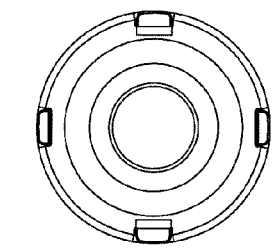
Figure 10D:
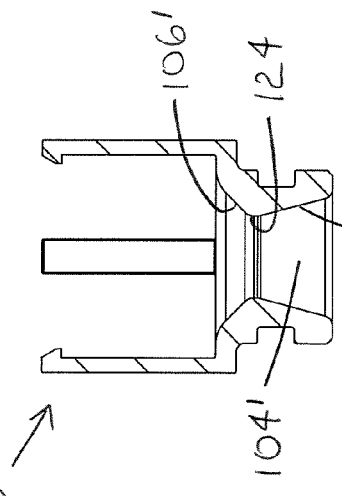
Figure 11A:
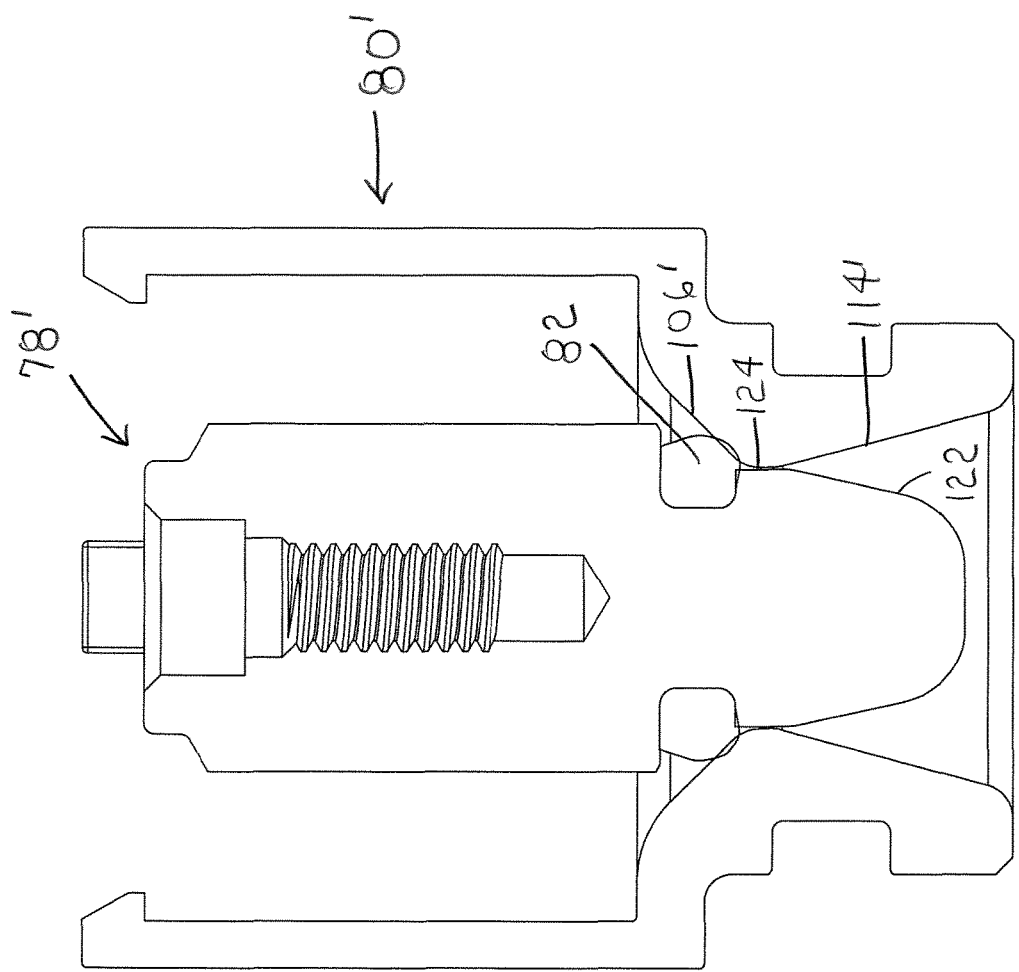
Figure 11B:
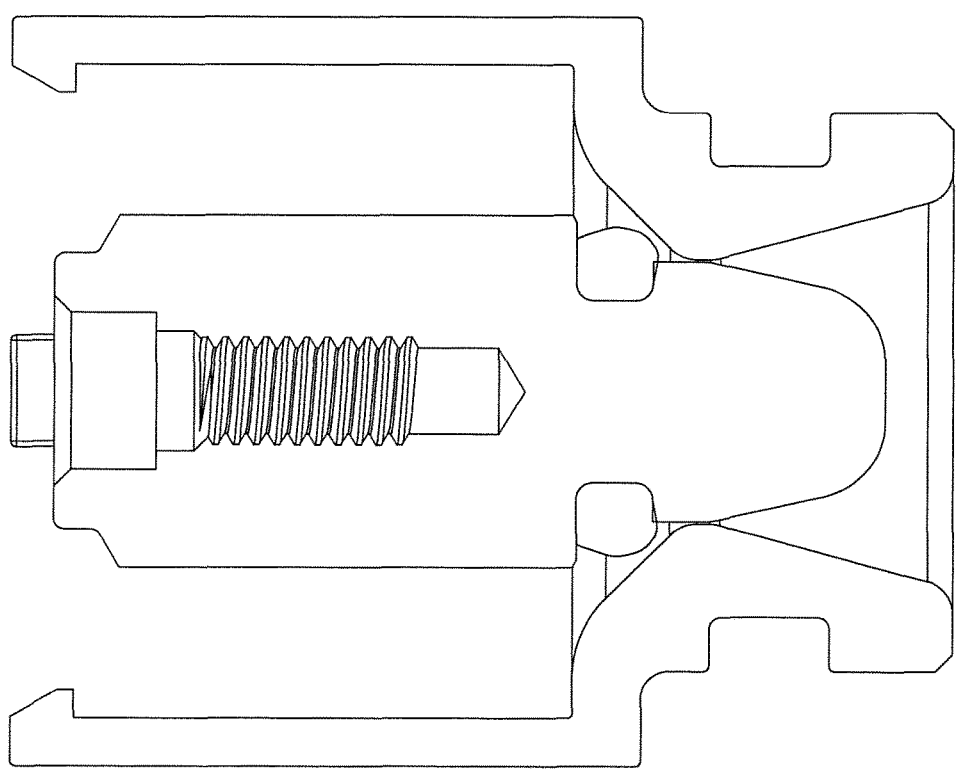
Figure 11C:
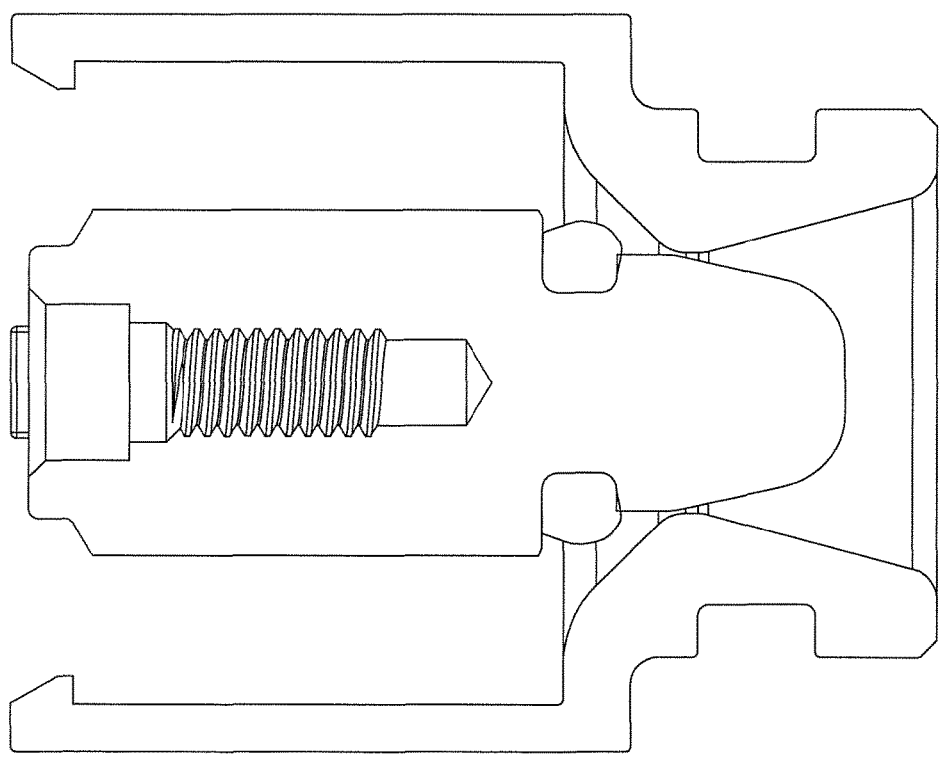
Figure 11D:
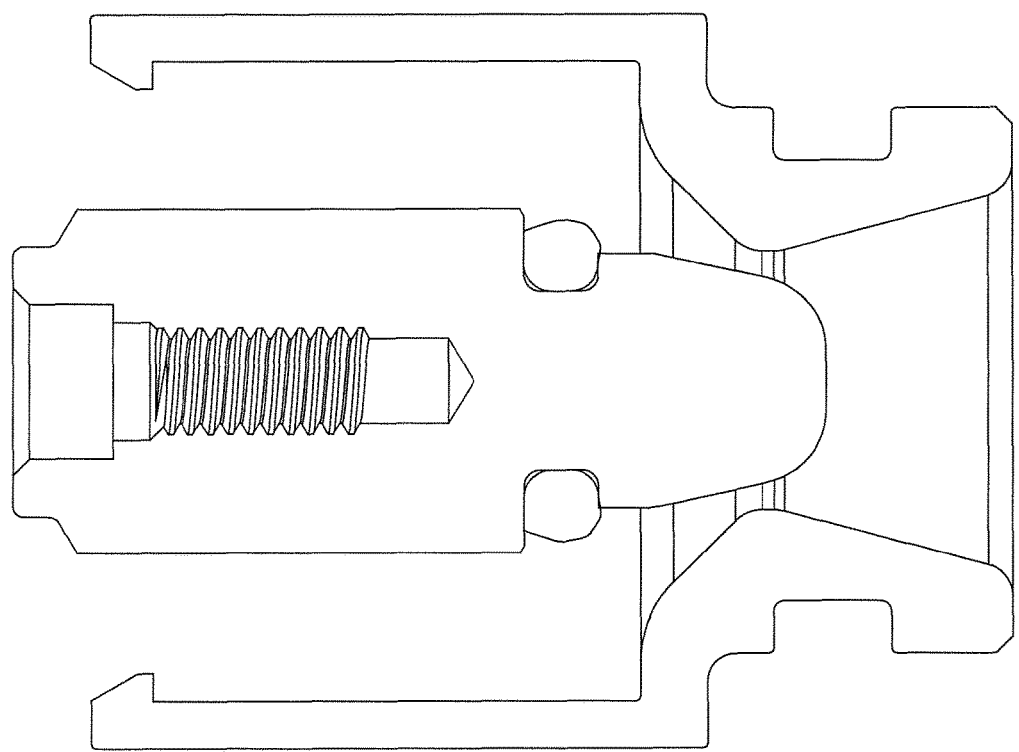
Figure 11A:
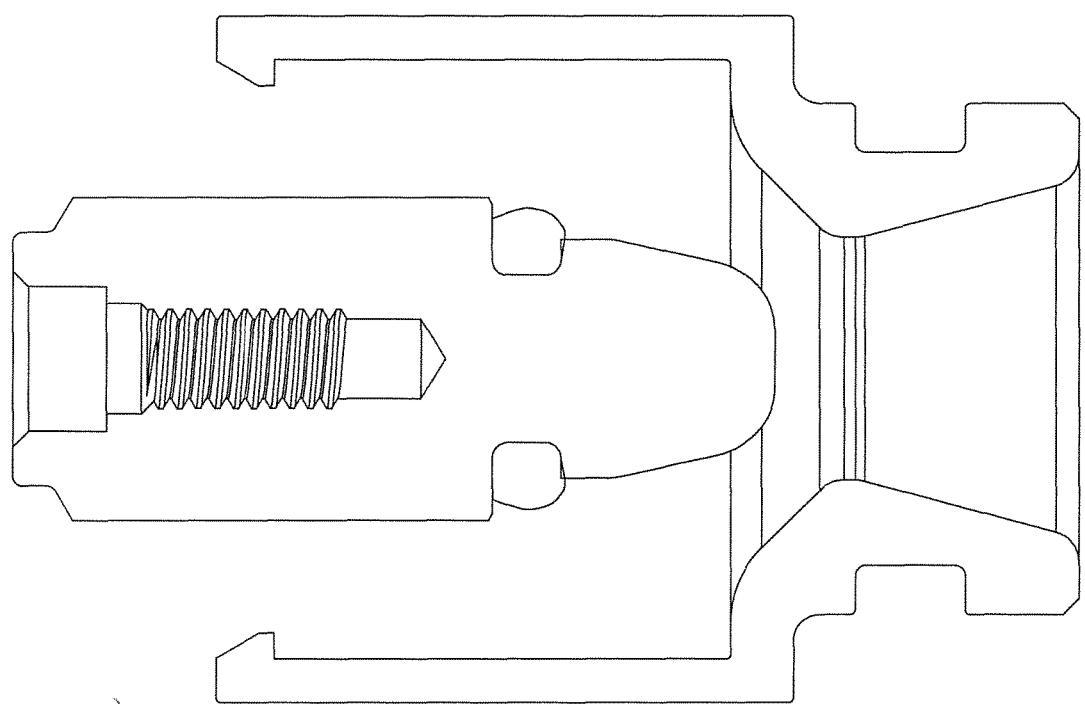
Figure 12B:
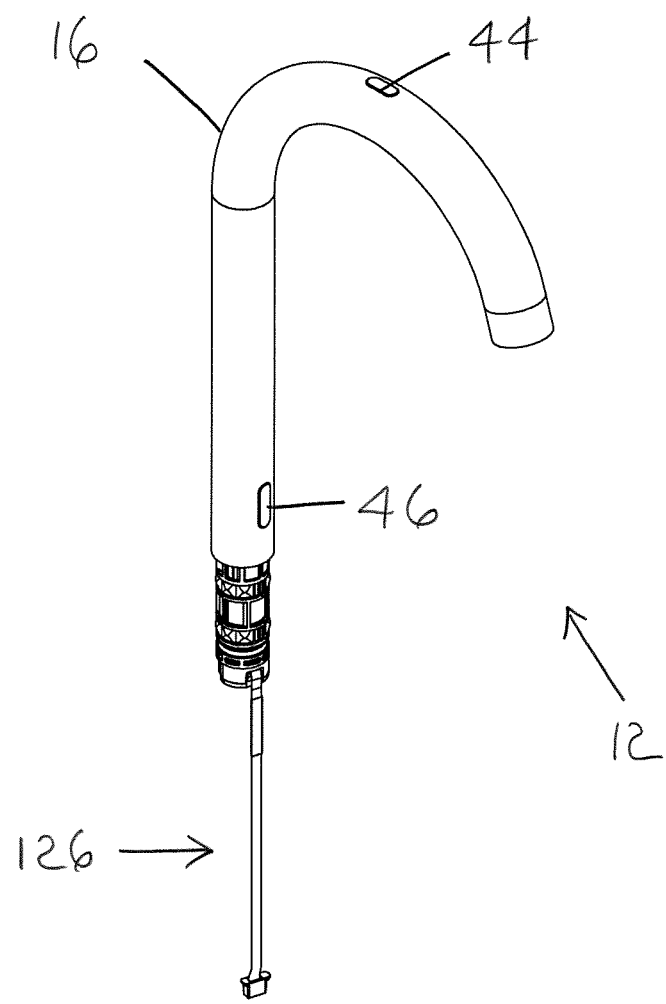
Figure 12C:
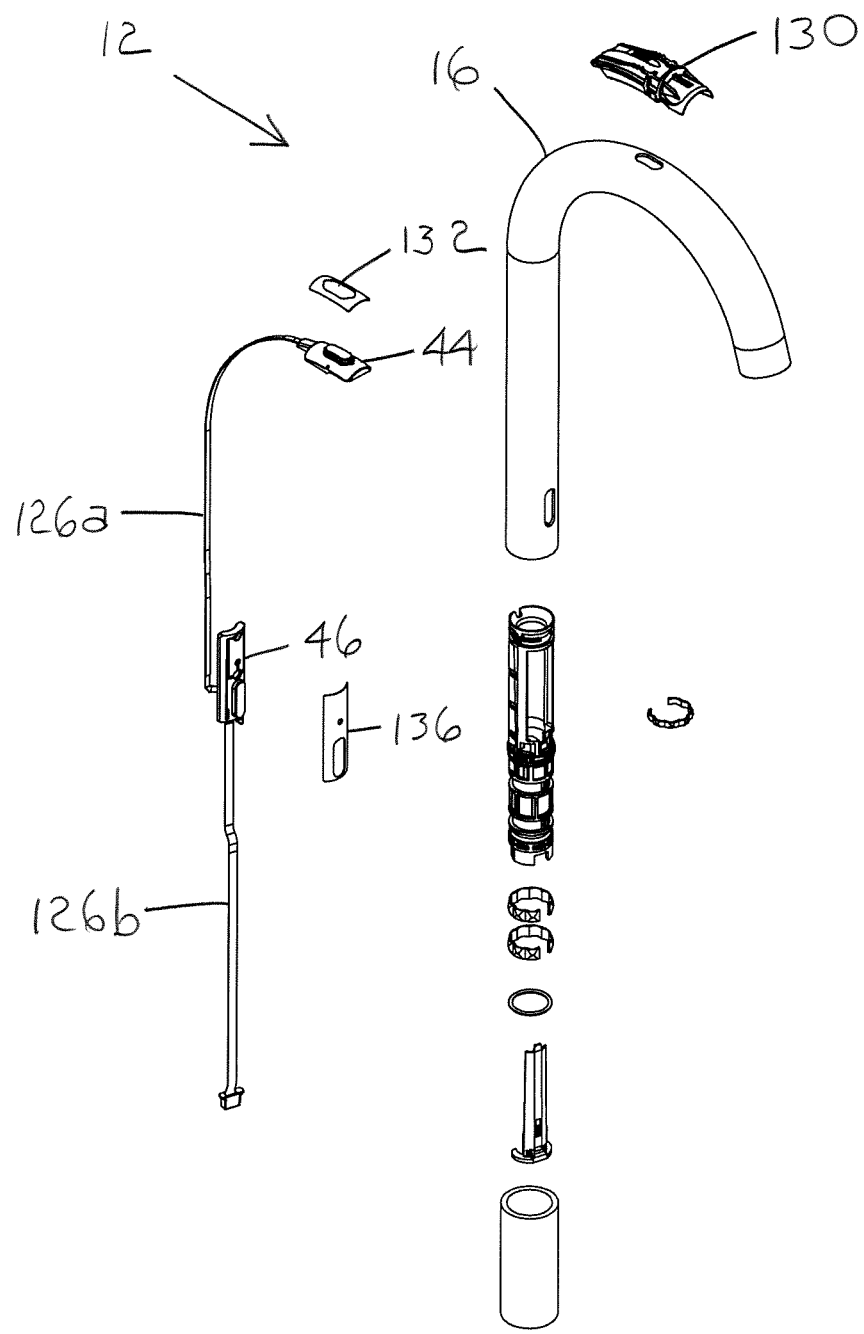
Figure 13B:
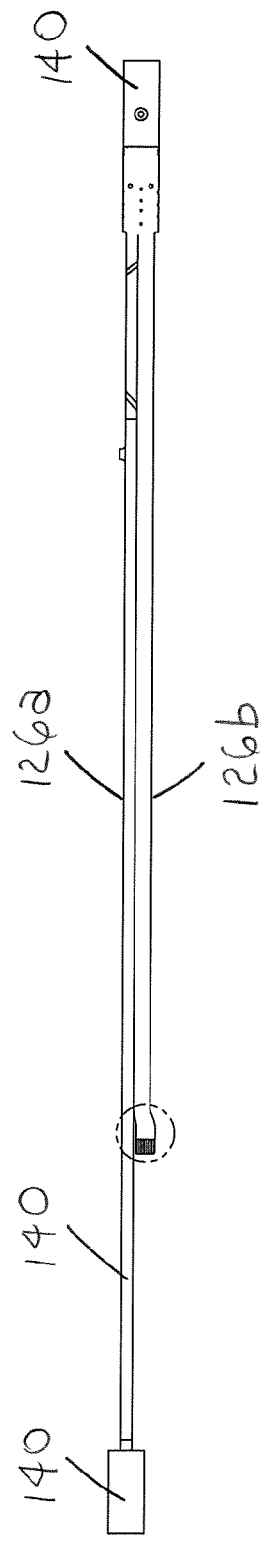
FIGS. 13a-13d include views of the electronic boards and the cables of FIGS. 12a-12c according to an exemplary embodiment of the present invention
Figure 13A:
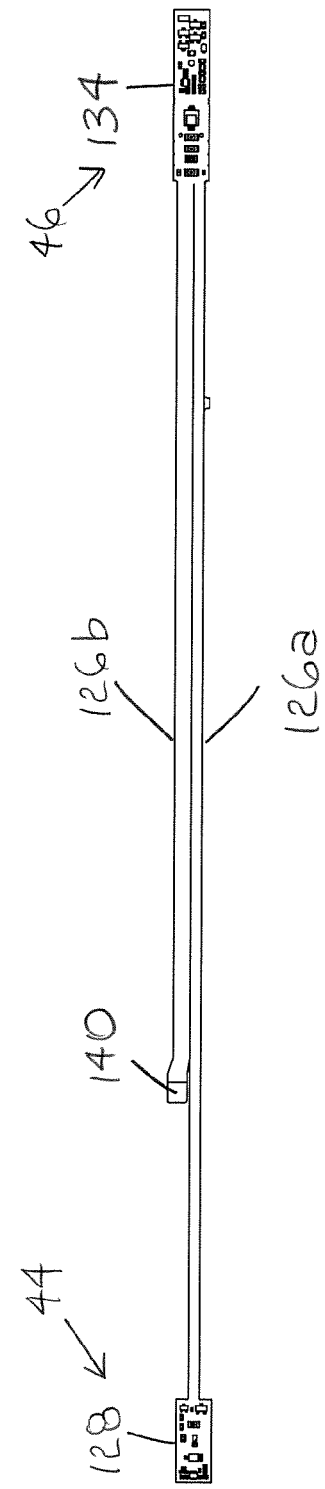
Figure 13C:
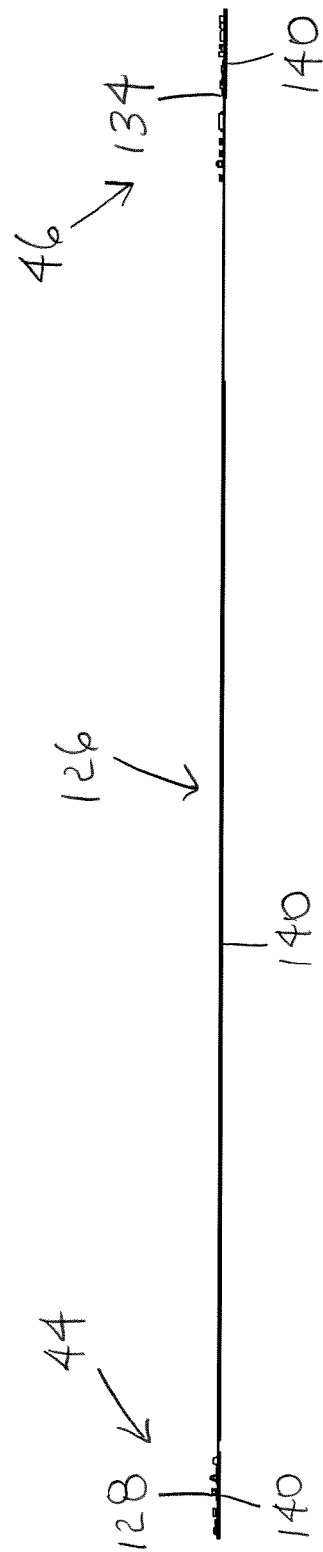
Figure 13D:
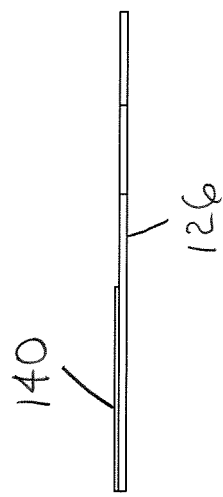

In the illustrated embodiment, as best shown in FIG. 2, the faucet 12 includes a hub 14, a spout 16, a flexible hose 18, a wand 20, and a handle 22. An upstream end of the hub 14 is connected to a mounting surface (such as a counter or sink). An upstream end of the spout 16 is connected to a downstream end of the hub 14. The spout 16 is operable to rotate relative to the hub 14. The flexible hose 18 extends through the hub 14 and the spout 16 and is operable to move within the hub 14 and the spout 16. An upstream end of the wand 20 is mounted in a downstream end of the spout 16 and is connected to a downstream end of the flexible hose 18. A downstream end of the wand 20 includes a discharge outlet 24 through which water is delivered from the faucet 12. The wand 20 is operable to be pulled away from the spout 16. The handle 22 covers a side opening in the hub 14 and is operable to be moved relative to the hub 14. Although the faucet 12 has been described as having a rotatable spout 16, a pull-out or pull-down wand 20, and a handle 22 mounted on the hub 14, one of ordinary skill in the art will appreciate that the spout 16 could be fixed relative to the hub 14, the faucet 12 may not include a wand 20, the handle 22 may be mounted on other locations on the faucet 12 or remote from the faucet 12, the faucet 12 could include more than one handle 22, the handle 22 may be any mechanical actuation device or user interface, and/or the faucet 12 may not include a handle 22.

Additionally, in the illustrated embodiment, as best shown in FIG. 1, the fitting 10 includes a hot water line 26, a cold water line 28, a mixed water line 30, and an electronic mixing valve 32. The electronic mixing valve 32 includes a hot water electronic valve 34 and a cold water electronic valve 36. An upstream end of the hot water line 26 connects to a hot water supply 38, and an upstream end of the cold water line 28 connects to a cold water supply 40. A downstream end of the hot water line 26 connects to the electronic mixing valve 32, and more specifically, the hot water electronic valve 34. A downstream end of the cold water line 28 connects to the electronic mixing valve 32 and, more specifically, the cold water electronic valve 36. An upstream end of the mixed water line 30 connects to the electronic mixing valve 32. A downstream end of the mixed water line 30 connects to the discharge outlet 24. In the illustrated embodiments, at least a portion of the mixed water line 30 is the flexible hose 18. As stated above, the downstream end of the flexible hose 18 connects to the upstream end of the wand 20. Although the faucet 12 has been described as including a hot water electronic valve 34 and a cold water electronic valve 36, one of ordinary skill in the art will appreciate that the faucet 12 could include one or more electronic valves and/or the faucet 12 could include one or more mechanical valves in series or in parallel with the electronic valve(s).

In an exemplary embodiment, the hot water electronic valve 34 and the cold water electronic valve 36 are proportional valves and, more specifically, stepper motor actuated valves. However, one of ordinary skill in the art will appreciate that, in some embodiments, the electronic valves could be any type of electronic valves.

Further, in the illustrated embodiments, as best shown in FIGS. 1 and 2, the fitting 10 includes an activation sensor 42, such as a toggle sensor 44 and a presence sensor 46 of the faucet 12.

In an exemplary embodiment, the toggle sensor 44 is a proximity sensor and, in particular, an infrared sensor. The toggle sensor 44 is also referred to as a latching sensor and a sustained-flow sensor. In the illustrated embodiment, the toggle sensor 44 is mounted on an apex of the spout 16. The toggle sensor 44 defines a toggle zone. In an exemplary embodiment, the toggle sensor 44 is operable to activate the hot water electronic valve 34 and the cold water electronic valve 36 when an object enters the toggle zone and to deactivate the hot water electronic valve 34 and the cold water electronic valve 36 when the object exits and reenters the toggle zone. As used herein, an "object" can be any portion of a user's body or any item used by the user to trigger the toggle sensor 44. In an exemplary embodiment, the toggle zone extends generally upwardly from the toggle sensor 44. Additionally, in an exemplary embodiment, the toggle zone has a generally cone-like shape.

In an exemplary embodiment, the presence sensor 46 is a proximity sensor, and, in particular, an infrared sensor. The presence sensor 46 is also referred to as a quick-strike sensor. In the illustrated embodiment, the presence sensor 46 is mounted on the upstream end of the spout 16. The presence sensor 46 defines a presence zone. In an exemplary embodiment, the presence sensor 46 is operable to activate the hot water electronic valve 34 and the cold water electronic valve 36 when an object enters the presence zone and to deactivate the hot water electronic valve 34 and the cold water electronic valve 36 when the object exits the presence zone. Again, as used herein, an "object" can be any portion of a user's body or any item used by the user to trigger the presence sensor 46. In an exemplary embodiment, the presence zone extends generally horizontally from the presence sensor 46. Additionally, in an exemplary embodiment, the presence zone has a generally cone-like shape.

As described above, the toggle sensor 44 and the presence sensor 46 are proximity sensors and, in particular, infrared sensors. Proximity sensors are sensors that detect the presence of an object without any physical contact. However, one of ordinary skill in the art will appreciate that the toggle sensor 44 and the presence sensor 46 could be any type of electronic sensors that can be triggered, including, but not limited to, other proximity sensors, touch sensors, and image sensors. Exemplary electronic sensors include, but are not limited to, electromagnetic radiation sensors (such as optical sensors and radar sensors), capacitance sensors, inductance sensors, piezo-electric sensors, and multi-pixel optical sensors (such as camera sensors). Moreover, the toggle sensor 44 and the presence sensor 46 may not be the same type of sensor. As further described above, the toggle sensor 44 is mounted on the apex of the spout 16 and the presence sensor 46 is mounted on the upstream end of the spout 16. However, one of ordinary skill in the art will appreciate that the toggle sensor 44 and the presence sensor 46 could be mounted in any location on the faucet 12 or in a location remote from the faucet 12. Furthermore, the toggle sensor 44 and the presence sensor 46 may be located in close proximity to each other or fairly remote from each other.

Similarly, as described above, the sensors are a toggle sensor 44 and a presence sensor 46. However, one of ordinary skill in the art will appreciate that the toggle sensor 44 and the presence sensor 46 could be any type of sensors that provide information useful in determining whether to activate or deactivate the hot water electronic valve 34 and the cold water electronic valve 36, including, but not limited to, flow sensors, pressure sensors, temperature sensors, and position sensors. Moreover, the toggle sensor 44 and the presence sensor 46 may be the same type of sensor.

Further, in the illustrated embodiment, as best shown in FIG. 1, the fitting 10 includes a parameter sensor 48. In an exemplary embodiment, the parameter sensor 48 is operable to detect movement of the handle 22 and to provide information to set at least one parameter of water flowing through the hot water electronic valve 34 and the cold water electronic valve 36 based on the movement of the handle 22. The parameter sensor 48 is operable to detect movement of the handle 22 either directly or indirectly. In an exemplary embodiment, based on the movement of the handle 22, the parameter sensor 48 provides information to set a temperature and/or a volume of water flowing through the hot water electronic valve 34 and the cold water electronic valve 36.

In the illustrated embodiments, the handle 22 operates as it would with a standard faucet. In other words, the handle 22 can be moved between various positions to indicate a desired temperature and volume of water discharged from the faucet 12.

More specifically, with regard to the temperature of water, the handle 22 can be rotated about a longitudinal axis of the side opening in the hub 14. At one extent of a range of rotation, the position of the handle 22 indicates all hot water (a full hot position). At the other extent of the range of rotation, the position of the handle 22 indicates all cold water (a full cold position). In between the extents of the range of rotation, the position of the handle 22 indicates a mix of hot and cold water (mixed temperature positions) with hotter temperature water as the position nears the full hot extent of the range of rotation and colder temperature water as the position nears the full cold extent of the range of rotation.

With regard to the volume of water, the handle 22 can be moved toward and away from the side opening in the hub 14. At one extent of a range of movement, the position of the handle 22 indicates no volume of water (a full closed position). At the other extent of the range of movement, the position of the handle 22 indicates full volume of water (a full open position). In between the extents of the range of movement, the position of the handle 22 indicates an intermediate volume of water (less than full open positions) with reduced volume water as the position nears the full closed extent of the range of movement and increased volume water as the position nears the full open extent of the range of movement.

Additionally, in the illustrated embodiment, as best shown in FIG. 2, the electronic faucet 12 includes a flow module 50, an electronics module 52, and a power module 54. The flow module 50 includes a number of inlets and outlets and a number of flow passages. These inlets/outlets and flow passages enable the easy management of the flow between the incoming supplies (i.e., the hot water supply 38 and the cold water supply 40) and the wand 20. In the illustrated embodiment, the hot water electronic valve 34 and the cold water electronic valve 36 are located inside the flow module 50. The electronics module 52 includes a number of electronic components. These components enable the activation and deactivation of the hot water electronic valve 34 and the cold water electronic valve 36. In the illustrated embodiment, the electronics module 52 is connected to the flow module 50. The power module 54 provides electrical power to electronic components of the faucet 12.

Further, in the illustrated embodiment, as best shown in FIG. 1, the fitting 10 includes an electronic control 56. The electronic control 56 receives information (such as signals) from the toggle sensor 44 and the presence sensor 46 to activate and deactivate the hot water electronic valve 34 and the cold water electronic valve 36. Moreover, the electronic control 56 receives information (such as signals) from the parameter sensor 48 to set parameters (such as the temperature and the volume) of water flowing through the hot water electronic valve 34 and the cold water electronic valve 36. In an exemplary embodiment, at least a portion of the electronic control 56 is located inside the electronics module 52. Although the fitting 10 has been described as having a separate electronic control 56, one of ordinary skill in the art will appreciate that the electronic control 56 could be incorporated into the toggle sensor 44, the presence sensor 46, and/or the parameter sensor 48.

In an exemplary embodiment, as best shown in FIGS. 3a-3b and 5a-5g, the electronic mixing valve 32 includes the hot water electronic valve 34, the cold water electronic valve 36, and a housing 58. The housing 58 includes a hot water inlet 60, a cold water inlet 62, a hot water electronic valve chamber 64, a cold water electronic valve chamber 66, a mixing chamber 68, and an outlet 70. The hot water electronic valve 34 is operable to be received in the hot water electronic valve chamber 64, and the cold water electronic valve 36 is operable to be received in the cold water electronic valve chamber 66.

In an exemplary embodiment, the hot water electronic valve 34 and the cold water electronic valve 36 are the same type of valve, i.e., a proportional valve and, more specifically, a stepper motor actuated valve. The following description of the electronic valve applies to both the hot water electronic valve 34 and the cold water electronic valve 36.

In an exemplary embodiment, as best shown in FIGS. 3a-5g, the hot/cold water electronic valve 34/36 includes a stepper motor 72, an upper housing 74, a lower housing 76h/76c, a piston 78, a seat 80, and various sealing members 82, such as O-rings. The motor 72 includes a shaft 84.

In an exemplary embodiment, as best shown in FIGS. 5a-5g, the lower housing 76h/76c of the hot/cold water electronic valve 34/36 is integral with the housing 58 of the electronic mixing valve 32. However, one of ordinary skill in the art will appreciate that the lower housing 76h/76c of the hot/cold water electronic valve 34/36 could be separate from the housing 58 of the electronic mixing valve 32.

In an exemplary embodiment, as best shown in FIGS. 6a-6e, the piston 78 includes a body 86 and a nose 88. In the illustrated embodiment, the body 86 is generally cylindrical shaped. More specifically, the body 86 is a hexagonal prism. The body 86 includes a recess 90 that is operable to receive a portion of the shaft 84. In the illustrated embodiment, the nose 88 includes a sealing member groove 92, a first conical portion 94, a cylindrical portion 96, and a second conical portion 98. The sealing member groove 92 is operable to receive the sealing member 82, such as an O-ring. Although the nose 88 of the piston 78 has been described as including specific portions, one of ordinary skill in the art will appreciate that the nose 88 of the piston 78 does not need to include each of these portions. For example, the nose 88 of the piston 78 may not include a second conical portion 98.

In an exemplary embodiment, as best shown in FIGS. 7a-7e, the seat 80 includes a body 100 and a plurality of projections 102 extending therefrom. In the illustrated embodiment, the body 100 is generally cylindrical shaped. In the illustrated embodiment, the seat 80 includes four projections 102 extending from the body 100. The projections 102 are operable to connect the seat 80 to the lower housing 76h/76c. The body 100 includes a central opening 104 extending therethrough. In the illustrated embodiment, the central opening 104 in the body 100 includes an inlet portion 106, a first cylindrical portion 108, a conical portion 110, a second cylindrical portion 112, and an outlet portion 114. The nose 88 of the piston 78 is operable to be received in and move in and out of the central opening 104 in the seat 80. Although the central opening 104 in the seat 80 has been described as including specific portions, one of ordinary skill in the art will appreciate that the central opening 104 in the seat 80 does not need to include each of these portions. For example, the central opening 104 in the seat 80 may not include a first cylindrical portion 112 and an outlet portion 114.

During operation of the hot/cold water electronic valve 34/36 including the piston 78 and the seat 80, as best shown in FIGS. 8a-8e, the hot/cold water electronic valve 34/36 moves from a completely closed position to a completely open position. In the completely closed position, no fluid flows through the hot/cold water electronic valve 34/36. In the completely open position, a maximum amount of fluid flows through the hot/cold water electronic valve 34/36. Between the completely closed position and the completely open position, an increasing amount of fluid flows through the hot/cold water electronic valve 34/36.

In the completely closed position, the sealing member 82 on the piston 78 is in sealing contact with the inlet portion 106 of the seat 80. Additionally, the first conical portion 94 and the cylindrical portion 96 of the piston 78 interface with the conical portion 110 and the second cylindrical portion 112 of the seat 80. As a result of the sealing contact between the sealing member 82 on the piston 78 and the inlet portion 106 of the seat 80, no fluid flows through the hot/cold water electronic valve 34/36.

As the piston 78 starts to move out of the seat 80, the sealing member 82 on the piston 78 loses sealing contact with the inlet portion 106 of the seat 80. Additionally, the first conical portion 94 and the cylindrical portion 96 of the piston 78 move away from the conical portion 110 and the second cylindrical portion 112 of the seat 80. As a result of the sealing member 82 on the piston 78 losing sealing contact with the inlet portion 106 of the seat 80, fluid starts to flow through the hot/cold water electronic valve 34/36.

As the piston 78 moves further out of the seat 80, the sealing member 82 on the piston 78 moves further away from the inlet portion 106 of the seat 80. Additionally, the first conical portion 94 and the cylindrical portion 96 of the piston 78 move further away from the conical portion 110 and the second cylindrical portion 112 of the seat 80. As a result, an increasing amount of fluid flows through the hot/cold water electronic valve 34/36.

In the completely open position, the sealing member 82 on the piston 78 is furthest away from the inlet portion 106 of the seat 80. Additionally, the first conical portion 94 and the cylindrical portion 96 of the piston 78 are furthest away from the conical portion 110 and the second cylindrical portion 112 of the seat 80. As a result, the maximum amount of fluid flows through the hot/cold water electronic valve 34/36.

Although the hot/cold water electronic valve 34/36 has been described with the sealing member 82 on the piston 78 interfacing with the inlet portion 106 of the seat 80, one of ordinary skill in the art will appreciate that the sealing member 82 could be on the seat 80 and interface with the nose 88 of the piston 78. Additionally, although the hot/cold water electronic valve 34/36 has been described as including a sealing member 82, such as an O-ring, in the sealing member groove 92 on the piston 78, one of ordinary skill in the art will appreciate that the sealing member 82 could be integrally formed with the piston 78 (or the seat 80 if the sealing member 82 is on the seat 80). Further, one of ordinary skill in the art will appreciate that the piston 78 (or the seat 80 if the sealing member 82 is on the seat 80) does not need to include a sealing member groove 92.

In another exemplary embodiment, as best shown in FIGS. 9a-9d, the piston 78' includes a body 86' and a nose 88'. In the illustrated embodiment, the body 86' is generally cylindrical shaped. More specifically, the body 86' is a hexagonal prism. The body 86' includes a recess 90' that is operable to receive a portion of the shaft 84. In the illustrated embodiment, the nose 88' includes a sealing member groove 92' and a dome-shaped portion 122. The sealing member groove 92' is operable to receive the sealing member 82, such as an O-ring.

In another exemplary embodiment, as best shown in FIGS. 10a-10d, the seat 80' includes a body 100' and a plurality of projections 102' extending therefrom. In the illustrated embodiment, the body 100' is generally cylindrical shaped. In the illustrated embodiment, the seat 80' includes four projections 102' extending from the body 100'. The projections 102' are operable to connect the seat 80' to the lower housing 76h/76c. The body 100' includes a central opening 104' extending therethrough. In the illustrated embodiment, the central opening 104' in the body 100' includes an inlet portion 106', a rounded portion 124, and an outlet portion 114'. The nose 88' of the piston 78' is operable to be received in and move in and out of the central opening 104' in the seat 80'. Although the central opening 104' in the seat 80' has been described as including specific portions, one of ordinary skill in the art will appreciate that the central opening 104' in the seat 80' does not need to include each of these portions. For example, the central opening 104' in the seat 80' may not include an outlet portion 114'.

During operation of the hot/cold water electronic valve 34/36 including the piston 78' and the seat 80', as best shown in FIGS. 11a-11e, the hot/cold water electronic valve 34/36 moves from a completely closed position to a completely open position. In the completely closed position, no fluid flows through the hot/cold water electronic valve 34/36. In the completely open position, a maximum amount of fluid flows through the hot/cold water electronic valve 34/36. Between the completely closed position and the completely open position, an increasing amount of fluid flows through the hot/cold water electronic valve 34/36.

In the completely closed position, the sealing member 82 on the piston 78' is in sealing contact with the inlet portion 106' of the seat 80'. Additionally, the dome-shaped portion 122 of the piston 78' interfaces with the rounded portion 124 of the seat 80'. As a result of the sealing contact between the sealing member 82 on the piston 78' and the inlet portion 106' of the seat 80', no fluid flows through the hot/cold water electronic valve 34/36.

As the piston 78' starts to move out of the seat 80', the sealing member 82 on the piston 78' loses sealing contact with the inlet portion 106' of the seat 80'. Additionally, the dome-shaped portion 122 of the piston 78' moves along the rounded portion 124 of the seat 80'. As a result of the sealing member 82 on the piston 78' losing sealing contact with the inlet portion 106' of the seat 80', fluid starts to flow through the hot/cold water electronic valve 34/36.

As the piston 78' moves further out of the seat 80', the sealing member 82 on the piston 78' moves further away from the inlet portion 106' of the seat 80'. Additionally, the dome-shaped portion 122 of the piston 78' moves further away from the rounded portion 124 of the seat 80'. As a result, an increasing amount of fluid flows through the hot/cold water electronic valve 34/36.

In the completely open position, the sealing member 82 on the piston 78' is furthest away from the inlet portion 106' of the seat 80'. Additionally, the dome-shaped portion 122 of the piston 78' is furthest away from the rounded portion 124 of the seat 80'. As a result, the maximum amount of fluid flows through the hot/cold water electronic valve 34/36.

Although the hot/cold water electronic valve 34/36 has been described with the sealing member 82 on the piston 78' interfacing with the inlet portion 106' of the seat 80', one of ordinary skill in the art will appreciate that the sealing member 82 could be on the seat 80' and interface with the nose 88' of the piston 78'. Additionally, although the hot/cold water electronic valve 34/36 has been described as including a sealing member 82, such as an O-ring, in the sealing member groove 92' on the piston 78', one of ordinary skill in the art will appreciate that the sealing member 82 could be integrally formed with the piston 78' (or the seat 80' if the sealing member 82 is on the seat 80'). Further, one of ordinary skill in the art will appreciate that the piston 78' (or the seat 80' if the sealing member 82 is on the seat 80') does not need to include a sealing member groove 92'.

Although the electronic plumbing fixture fitting 10 has been described as including an electronic mixing valve 32 and the electronic mixing valve 32 has been described as including a hot water electronic valve 34 and a cold water electronic valve 36, one of ordinary skill in the art will appreciate that the electronic valve could be used as a shutoff valve in addition to or in place of the mixing valve. Additionally, when the electronic valve is used as a shutoff valve, the seat 80/80' could be integrated into the valve housing.

As best shown in FIGS. 12a-12c and 13a-13d, the toggle sensor 44, the presence sensor 46, and the electronic control 56 are electrically connected via cables 126. The toggle sensor 44 is operable to send a signal to the electronic control 56 when the toggle sensor 44 is triggered. The electronic control 56 is operable to receive the signal from the toggle sensor 44 when the toggle sensor 44 is triggered and, in response, send a signal to the hot/cold water electronic valve 34/36 to activate the hot/cold water electronic valve 34/36. The presence sensor 46 is operable to send a signal to the electronic control 56 when the presence sensor 46 is triggered. The electronic control 56 is operable to receive the signal from the presence sensor 46 when the presence sensor 46 is triggered and, in response, send a signal to the hot/cold water electronic valve 34/36 to activate the hot/cold water electronic valve 34/36.

In an exemplary embodiment, the toggle sensor 44 is located above the mounting surface. As stated above, in the illustrated embodiment, the toggle sensor 44 is mounted on the apex of the spout 16. In an exemplary embodiment, the toggle sensor 44 is mounted on a first electronic board 128.

Additionally, the toggle sensor 44 is mechanically and electrically connected to the presence sensor 46. In the illustrated embodiment, a first cable 126*a* is operable to mechanically and electrically connect the toggle sensor 44 to the presence sensor 46 and mechanically support the toggle sensor 44. In an exemplary embodiment, the first cable 126*a* is located above the mounting surface. Further, in an exemplary embodiment, the toggle sensor 44 has mounting structure associated with it. In the illustrated embodiment, the toggle sensor 44 has a bracket 130 and adhesive 132 that maintain the toggle sensor 44 in position on the apex of the spout.

In an exemplary embodiment, the presence sensor 46 is located above the mounting surface. As stated above, in the illustrated embodiment, the presence sensor 46 is mounted on the upstream end of the spout 16. In an exemplary embodiment, the presence sensor 46 is mounted on a second electronic board 134. Additionally, the presence sensor 46 is mechanically and electrically connected to the electronic control 56. In the illustrated embodiment, a second cable 126*b* is operable to mechanically and electrically connect the presence sensor 46 to the electronic control 56 and mechanically support the presence sensor 46. In an exemplary embodiment, the second cable 126*b* is located above the mounting surface. In an exemplary embodiment, at least a portion of the second cable 126*b* is located above the mounting surface. Further, in an exemplary embodiment, the presence sensor 46 has mounting structure associated with it. In the illustrated embodiment, the presence sensor 46 has adhesive 136 that maintains the presence sensor 46 in position on the upstream end of the spout.

In an exemplary embodiment, at least a portion of the electronic control 56 is located above the mounting surface. In an exemplary embodiment, the portion of the electronic control 56 located above the mounting surface includes a control module 138. In the illustrated embodiment, the control module 138 is located in a portion of the hub 14 to which the handle 22 is mounted. An exemplary embodiment of an electronic faucet with an electronic control associated with a handle is disclosed in U.S. patent application Ser. No. 13/889,186 filed on May 7, 2013, which was published as U.S. Patent App. Pub. No. 2013/0291978 A1 on Nov. 7, 2013, and which issued as U.S. Pat. No. 9,212,473 B2 on Dec. 15, 2015, for Electronic Plumbing Fixture Fitting, the entire disclosures of which are hereby incorporated by reference. In an exemplary embodiment, the control module 138 is operable to receive the signal from the toggle sensor 44 or the presence sensor 46 when the toggle sensor 44 or the presence sensor 46 is triggered and, in response, send the signal to the hot/cold water electronic valve 34/36 to activate the hot/cold water electronic valve 34/36. In an exemplary embodiment, the second cable 126*b* is operable to electrically connect the presence sensor 46 to the portion of the electronic control 56 located above the mounting surface. In the illustrated embodiment, the second cable 126*b* is operable to electrically connect the presence sensor 46 to the control module 138.

In an exemplary embodiment, at least a portion of the electronic control 56 is located below the mounting surface. In an exemplary embodiment, the portion of the electronic control 56 located below the mounting surface includes the electronics module 52. In the illustrated embodiment, the electronics module 52 is connected to the flow module 50. In an exemplary embodiment, the electronics module 52 is operable to receive the signal from the toggle sensor 44 or the presence sensor 46 when the toggle sensor 44 or the presence sensor 46 is triggered and, in response, send the signal to the hot/cold water electronic valve 34/36 to activate the hot/cold water electronic valve 34/36. In an exemplary embodiment, at least a portion of the cable 126, such as the second cable 126*b*, is operable to directly electrically connect the presence sensor 46 to the portion of the electronic control 56 located below the mounting surface. In an exemplary embodiment, at least a portion of the cable 126, such as the second cable 126*b*, is operable to directly electrically connect the presence sensor 46 to the electronics module 52. In an exemplary embodiment, at least a portion of the cable 126 is operable to indirectly electrically connect the presence sensor 46 to the portion of the electronic control 56 located below the mounting surface. In the illustrated embodiment, a third cable 126*c* is operable to indirectly electrically connect the presence sensor 46 to the electronics module 52 via the second cable 126*b* and the control module 138.

In an exemplary embodiment, at least a portion of the electronic control 56 is located above the mounting surface, and at least a portion of the electronic control 56 is located below the mounting surface. In an exemplary embodiment, the portion of the electronic control 56 located above the mounting surface is the control module 138, and the portion of the electronic control 56 located below the mounting surface is the electronics module 52. In an exemplary embodiment, at least one of the control module 138 and the electronics module 52 is operable to receive the signal from the toggle sensor 44 or the presence sensor 46 when the toggle sensor 44 or the presence sensor 46 is triggered and, in response, send the signal to the hot/cold water electronic valve 34/36 to activate the hot/cold water electronic valve 34/36. In an exemplary embodiment, the second cable 126*b* is operable to electrically connect the presence sensor 46 to the portion of the electronic control 56 located above the mounting surface, and at least a portion of the cable 126, such as the second cable 126*b* and/or the third cable 126*c*, is operable to electrically connect the presence sensor 46 to the portion of the electronic control 56 located below the mounting surface. In the illustrated embodiment, the second cable 126*b* is operable to electrically connect the presence sensor 46 to the control module 138, and at least a portion of the cable 126, such as the second cable 126*b* and/or the third cable 126*c*, is operable to electrically connect the presence sensor 46 to the electronics module 52.

In the illustrated embodiment, the first electronic board 128 is a first flexible printed circuit board (PCB). In an exemplary embodiment, the toggle sensor 44 is surface mounted on the first flexible PCB. In the illustrated embodiment, at least a portion of the first flexible PCB is attached to a stiffener 140 that provides mechanical support. Additionally, in the illustrated embodiment, the first cable 126*a* operable to electrically connect the toggle sensor 44 to the presence sensor 46 is a second flexible printed circuit board (PCB). In the illustrated embodiment, at least a portion of the second flexible PCB is attached to a stiffener 140 that provides mechanical support.

In the illustrated embodiment, the second electronic board 134 is a third flexible printed circuit board (PCB). In an exemplary embodiment, the presence sensor 46 is surface mounted on the third flexible PCB. In the illustrated embodiment, at least a portion of the third flexible PCB is attached to a stiffener 140 that provides mechanical support. Additionally, in the illustrated embodiment, the second cable 126*b* operable to electrically connect the presence sensor 46 to the control module 138 is a fourth flexible printed circuit board (PCB). In the illustrated embodiment, at least a portion of the fourth flexible PCB is attached to a stiffener 140 that provides mechanical support.

In the illustrated embodiment, the third cable 126c operable to indirectly electrically connect the presence sensor 46 to the electronics module 52 is a communications wire.

In an exemplary embodiment, the first electronic board 128 on which the toggle sensor 44 is mounted, the first cable 126a operable to electrically connect the toggle sensor 44 to the presence sensor 46, and the second electronic board 134 on which the presence sensor 46 is mounted are integrally formed. In an exemplary embodiment, the first electronic board 128 on which the toggle sensor 44 is mounted, the first cable 126a operable to electrically connect the toggle sensor 44 to the presence sensor 46, the second electronic board 134 on which the presence sensor 46 is mounted, and the second cable 126b operable to electrically connect the presence sensor 46 to any portion of the electronic control 56 located above the mounting surface are integrally formed. In an exemplary embodiment, the first electronic board 128 on which the toggle sensor 44 is mounted, the first cable 126a operable to electrically connect the toggle sensor 44 to the presence sensor 46, the second electronic board 134 on which the presence sensor 46 is mounted, and at least the portion of the second cable 126b located above the mounting surface are integrally formed. In the illustrated embodiment, the first flexible PCB on which the toggle sensor 44 is mounted, the second flexible PCB operable to electrically connect the toggle sensor 44 to the presence sensor 46, the third flexible PCB on which the presence sensor 46 is mounted, and the fourth flexible PCB operable to electrically connect the presence sensor 46 to the control module 138 are integrally formed. As a result, all of the sensors and the mechanical and electrical connections between the sensors and any portion of the electronic control 56 that is located above the mounting surface for the fitting do not include any separate connectors.

One of ordinary skill in the art will now appreciate that the present invention provides an electronic plumbing fixture fitting with a sensor mounted on an electronic board, such as an electronic faucet with a sensor mounted on an electronic board. Although the present invention has been shown and described with reference to particular embodiments, equivalent alterations and modifications will occur to those skilled in the art upon reading and understanding this specification. The present invention includes all such equivalent alterations and modifications and is limited only by the scope of the following claims in light of their full scope of equivalents.

What is claimed is:

1. An electronic plumbing fixture fitting, comprising:
a discharge outlet, the discharge outlet being operable to deliver water, the discharge outlet being located above a mounting surface for the fitting;
an electronic valve, the electronic valve being operable to permit flow of water through the discharge outlet when the electronic valve is activated and to not permit flow of water through the discharge outlet when the electronic valve is deactivated;
a first sensor, the first sensor being operable to send a first signal when the first sensor is triggered, the first sensor being mounted on a first electronic board, the first sensor being located above the mounting surface;
a second sensor, the second sensor being operable to send a second signal when the second sensor is triggered, the second sensor being mounted on a second electronic board, the second sensor being located above the mounting surface;
an electronic control, the electronic control being operable to receive the first signal from the first sensor when the first sensor is triggered and, in response, send a first signal to the electronic valve to activate the electronic valve, the electronic control being operable to receive the second signal from the second sensor when the second sensor is triggered and, in response, send a second signal to the electronic valve to activate the electronic valve, at least a portion of the electronic control being located above the mounting surface;
a first cable, the first cable being operable to electrically connect the first sensor to the second sensor, the first cable being located above the mounting surface; and
a second cable, the second cable being operable to electrically connect the second sensor to the electronic control, at least a portion of the second cable being operable to electrically connect the second sensor to the portion of the electronic control located above the mounting surface;
wherein the first electronic board, the second electronic board, the first cable, and at least the portion of the second cable operable to electrically connect the second sensor to the portion of the electronic control located above the mounting surface are integrally formed; and
wherein the second electronic board is a third flexible printed circuit board, and the portion of the second cable operable to electrically connect the second sensor to the portion of the electronic control located above the mounting surface is a fourth flexible printed circuit board.

2. The electronic plumbing fixture fitting of claim 1, wherein at least a portion of the third flexible printed circuit board is attached to a stiffener, and at least a portion of the fourth flexible printed circuit board is attached to a stiffener.

* * * * *